United States Patent [19]

Gay et al.

[11] Patent Number: 5,577,189

[45] Date of Patent: *Nov. 19, 1996

[54] METHOD OF ESTABLISHING CONSTRAINTS BETWEEN GRAPHICAL ELEMENTS

[75] Inventors: Jonathan L. Gay, San Diego; Robert B. Tatsumi, Poway, both of Calif.

[73] Assignee: Adobe Systems Incorporated, Mountain View, Calif.

[*] Notice: The term of this patent shall not extend beyond the expiration date of Pat. No. 5,437,008.

[21] Appl. No.: 438,977

[22] Filed: May 11, 1995

Related U.S. Application Data

[63] Continuation of Ser. No. 904,059, Jun. 23, 1992, Pat. No. 5,437,008.
[51] Int. Cl.$^6$ .................................................. G06F 3/00
[52] U.S. Cl. .................................... 395/326; 395/139
[58] Field of Search ........................... 395/155–161, 395/133–139, 700; 364/474.22–474.24, 488–491

[56] References Cited

U.S. PATENT DOCUMENTS

| | | | |
|---|---|---|---|
| 4,974,174 | 11/1990 | Kleinman | 395/156 |
| 5,123,087 | 6/1992 | Newell et al. | 395/155 |
| 5,333,254 | 7/1994 | Robertson | 395/155 |
| 5,371,845 | 12/1994 | Newell et al. | 395/155 |

OTHER PUBLICATIONS

A. Borning et al., "Constraint Hierarchies," *OOPSLA '87 Proceedings*, Oct. 1987, pp. 48–60.

J. Borzo, "Aldus Carves Niche with Draw Program; Intellidraw Wows Testers," Abstract from *InfoWorld*, Jun. 1992.

A. Cosar et al., "A Text Image and Graphics Editor," *Computers & Graphics*, vol. 15, No. 1, 1991, pp. 57–66.

B. N. Freeman–Benson et al., "An Incremental Constraint Solver," *Communications of the ACM*, vol. 33, No. 1, Jan. 1990, pp. 54–63.

*Fullwrite Professional—A User's Guide*, Ashton–Tate Corporation, 1988, pp. i–v, 123–159.

*Graph Plus—Using Graph Plus*, Micrografx, Inc., 1988, pp. 5–1 to 5 –13, 8–1 to 5 8–23.

V. Joloboff, "An Interactive Graphics Editor for Document Preparation," *ACM Conference on Personal and Small Computers*, vol. 6, No. 2, Dec. 7, 1983, pp. 45–53.

*MacDraw Pro User's Guide*, Claris Corporation, 1991, pp. 3–2 to 3–41.

(List continued on next page.)

*Primary Examiner*—Raymond J. Bayerl
*Assistant Examiner*—John E. Breene
*Attorney, Agent, or Firm*—Fish & Richardson P.C.

[57] ABSTRACT

A user interface (UI) may be used in specifying spatial relationships between graphical elements in a graphics environment with drawing or graphical element manipulating functions. The UI interacts with the operating system through an application shell. A document engine, a graphics engine, and a constraint engine are coupled between the UI and operating system. A user may create a distribution frame with an area on a page of a documents and a set of elements may be specified to be automatically linked by the distribution frame. Graphical elements positioned within the distribution frame are governed by alignment and distribution criteria. The user may select alignment and distribution criteria to determine the spatial relationships between the elements in the set and the distribution frame. One or more dimensions of the graphical elements in the distribution frame are a function of the area encompassed by the distribution frame where a user's edits to one may affect the other. Spatial relationships between graphical elements are established using unidirectional and bidirectional links between pairs of graphical elements. With a unidirectional link, a master/slave relationship is established where attempts to edit the slave graphical element in a way that affects the constraint are inhibited.

10 Claims, 18 Drawing Sheets

OTHER PUBLICATIONS

J. H. Maloney et al., "Constraint Technology for User–Interface Construction in ThingLab II," *OOPSLA '89 Proceedings*, Oct. 1989, pp. 381–388.

T. Matsuura et al., "A Drawing Editor Key 3 with Capabilities of Defining Figure Parts and Preserving Connection/Inclusion Relationships," *Systems and Computers in Japan*, vol. 22, No. 14, 1991, pp. 14–25.

R. Mills, "DesignView Links Geometry and Equations," *Computer Aided Engineering*, Sep. 1989.

B. A. Myers et al., "Garnet: Comprehensive Support for Graphical, Highly Interactive User Interfaces," *Computer*, Nov. 1990, pp. 71–85.

P. A. Szekely et al., "A User Interface Toolkit Based on Graphical Objects and Constraints," *OOPSLA '88 Proceedings*, Sep. 1988, pp. 36–45.

Swivel 3D Professional v2.0 User's Guide, VPL Research, 1990, pp. 3–1 to 3–9, 4–1 to 4–16, 5–5 to 5–11, 14–1 5o 14–5, 15–1 to 15–11, 18–1 to 18–B.

MacDraw Pro User's Guide, Claris Corp, 1991, pp. 3–2 to 3–40, chpt 4.

Robinson, "Premise Provides a Flexible Design Tool", Comp. Graphics, World, Sep. 1989, pp. 117–121.

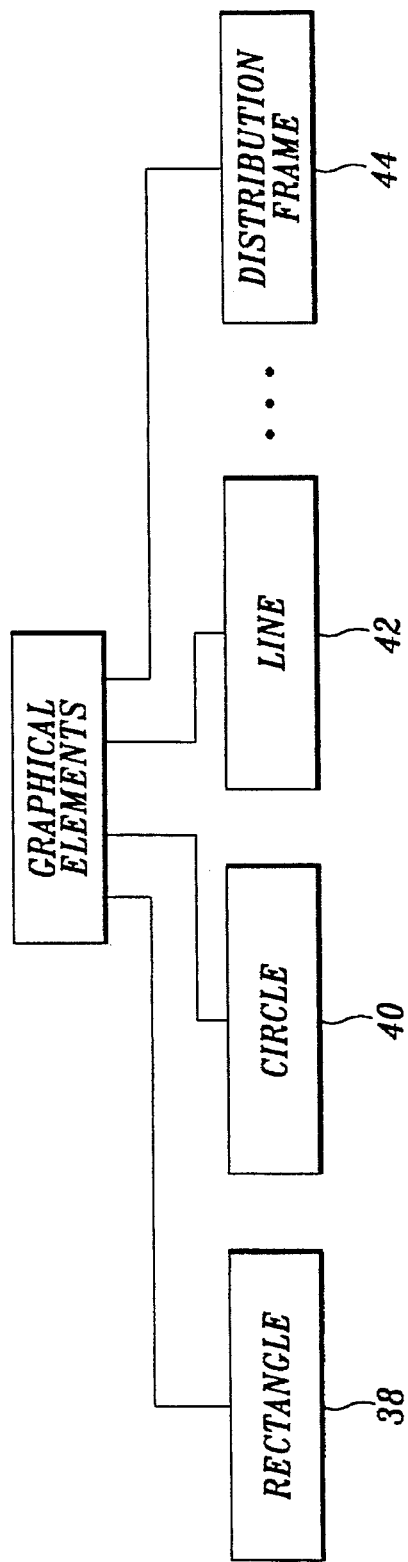
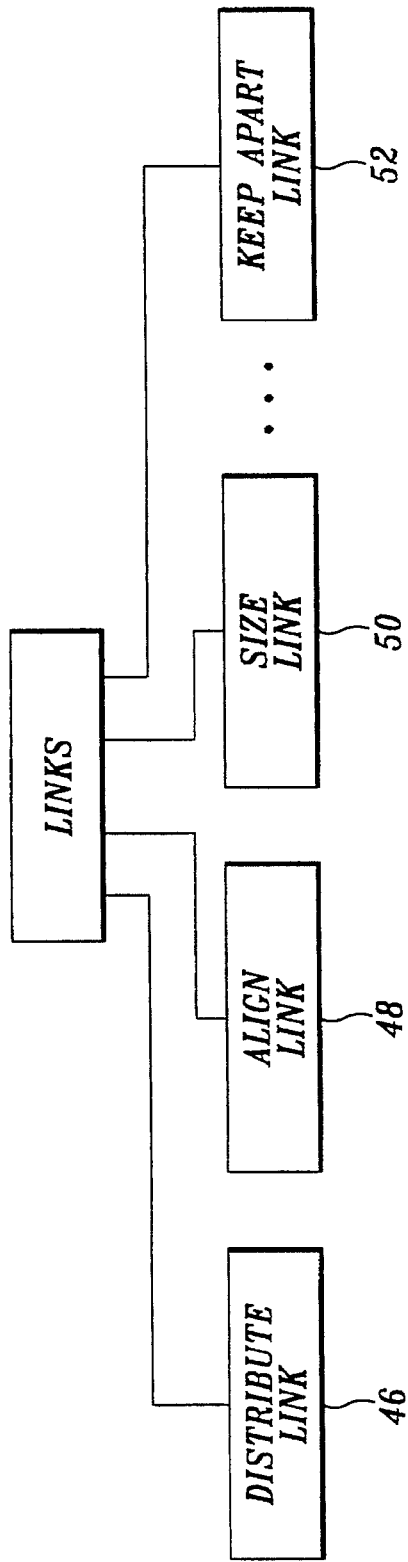
Fig.2.
Fig.3.

METHOD OF ESTABLISHING CONSTRAINTS BETWEEN GRAPHICAL ELEMENTS

This is a continuation of the prior application Ser. No. 07/904,059, filed Jun. 23, 1992, now U.S. Pat. No. 5,437,008, the benefit of the filing date of which is hereby claimed under 35 U.S.C. §120.

FIELD OF THE INVENTION

This invention generally relates to computer drawing programs and, more specifically, to a system and method for specifying graphical alignment and distribution criteria between graphical elements to be displayed and/or printed.

BACKGROUND OF THE INVENTION

A number of currently available desktop publishing and other computer programs allow a user to draw and manipulate graphical elements within a document. The ability to draw and manipulate graphical elements has become increasingly important because the use of organizational charts, data tables, bar charts and other graphical aids continues to increase as information purveyors attempt to communicate extensive and often detailed facts, figures and other concepts. Examples of currently available programs having graphical elements, drawing and manipulating capabilities include SuperPaint® from Silicon Beach Software, MacDraw™ from Claris Corporation, Canvas™ from the Deneba Corporation, and PageMaker® from Aldus Corporation.

A primary goal of users of programs having drawing and manipulating capabilities is to input, manipulate and present (on-screen or through an output device) graphical elements as efficiently as possible. Currently available programs generally include alignment features that allow graphical elements to be precisely aligned and spaced relative to one another. However, once the alignment command is executed, the user is free to move the graphical elements out of alignment. This presents a significant disadvantage during editing, because a user is required to continually apply alignment commands to ensure that graphical elements remain aligned and spaced as desired during editing. Thus, it would be advantageous to have a way of establishing a persistent relationship between graphical elements that keeps selected graphical elements aligned and spaced despite further editing or modification of graphical or other elements before a document is printed.

The present invention is a method of establishing spatial relationships between two graphical elements displayed on a page in response to a user's input. Each graphical element has dimensional attributes and a position on the page. The method comprises: (a) selecting a first, master, graphical element in response to user input; (b) selecting a second, slave, graphical element in response to user input; (c) establishing, in response to user input, a constraint relationship between the master and slave graphical elements that links the attributes or position of the master element to the attributes or position, respectively, of the slave element wherein the constraint relationship between the master and slave elements is maintained throughout editing of the elements by the user; and (d) automatically monitoring any user-initiated attempts to edit the attributes or position of either the master or slave elements which affect the constraint relationship therebetween; and (i) if an edit to the attributes or position of the master element affecting the constraint is attempted, then modifying the attribute or position, respectively, of both the master and the slave elements in accordance with the constraint; or (ii) if an edit to the attributes or position of the slave element affecting the constraint is attempted, then inhibiting the attempt to edit the attribute or position of the slave element.

In accordance with other aspects of the invention, the dimensional attributes for each graphical element determine the shape, size, and color of the graphical element. Further, the constraint relationship may include tying the size, e.g., width or height, of the slave element to the size of the master element.

In accordance with Further aspects of the invention, the constraint relationship includes aligning the graphical elements along a vertical axis. In another aspect, the constraint relationship includes aligning the graphical elements along a horizontal axis.

In accordance with still Further aspects of the invention, the method includes creating, in response to user input, a distribution frame defining an area on the page bordered by a boundary; and automatically linking the graphical elements to the distribution frame, wherein the graphical elements are encompassed by the boundary. In another aspect, the step of establishing a constraint relationship established between the graphical elements includes the step of arranging the graphical elements in the distribution frame in an order. In a further aspect, the step of arranging the graphical elements in the distribution frame in an order includes the step of locking the order of the graphical elements in the distribution frame so that the order of the graphical elements cannot be rearranged.

BRIEF DESCRIPTION OF THE DRAWINGS

The foregoing features and advantages of the invention will become better understood by reference to the following detailed description, when taken in conjunction with the accompanying drawings, wherein:

FIG. 2 is a hierarchical diagram depicting exemplary graphical elements;

FIG. 3 is a hierarchical diagram depicting exemplary constraints, referred to as links throughout this disclosure;

DETAILED DESCRIPTION OF THE PREFERRED EMBODIMENT

Figure 1:
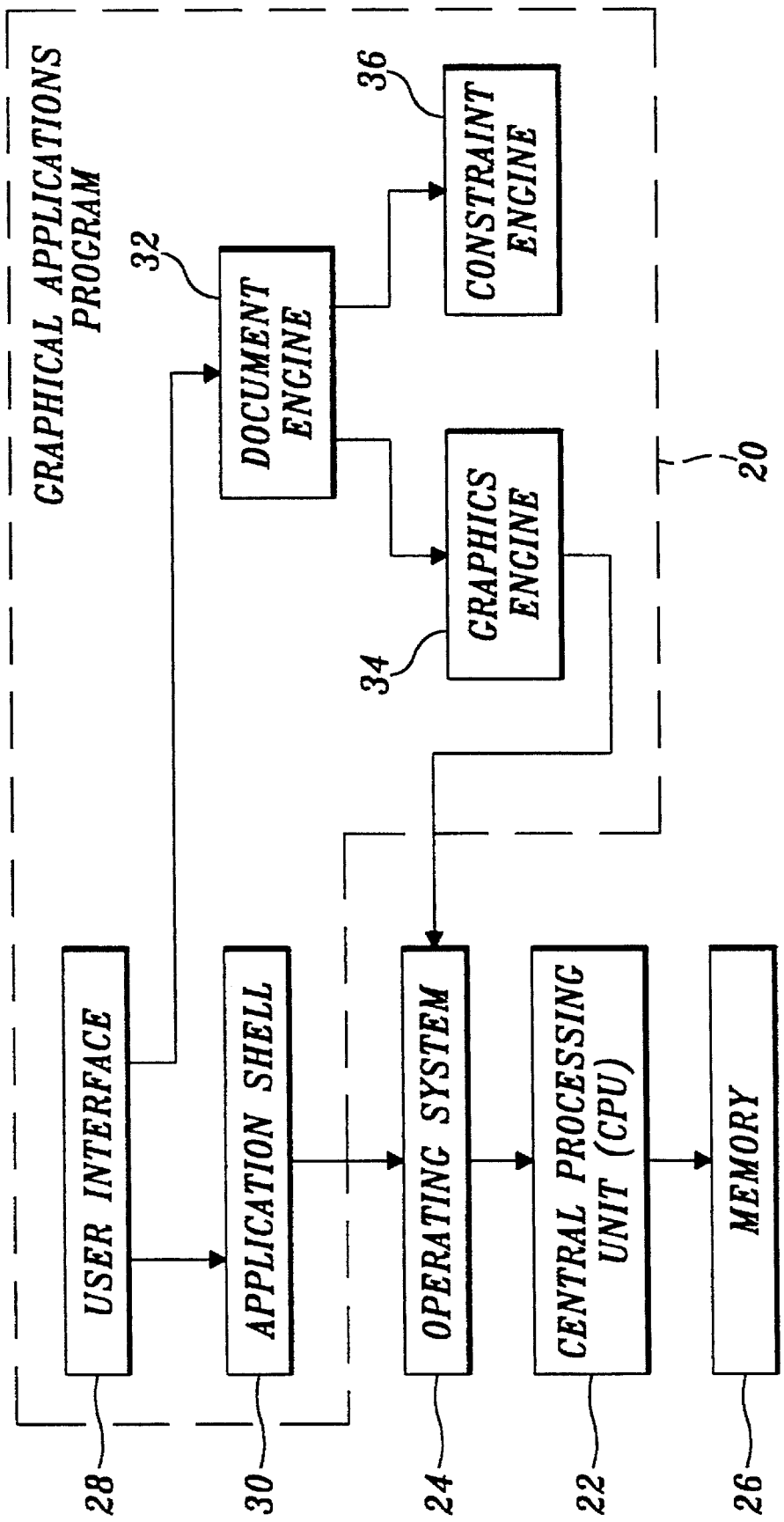
FIG. 1 is a block diagram of a graphical applications program formed in accordance with the invention.

A graphical applications program 20 for specifying alignment and distribution criteria between graphical elements is shown generally in FIG. 1. The graphical applications program 20 runs on a central processing unit (CPU) 22 controlled by an operating system 24. A memory 26 is connected to the CPU and generally comprises, for example, random access memory (RAM), read only memory (ROM), and magnetic storage media such as a hard drive, floppy disk, or magnetic tape. The CPU 22 may be housed within a personal computer, minicomputer, or a mainframe (with one or more users), as the benefits and functionality of the graphical applications program 20 may be implemented on a number of types of computers. In order to avoid unduly complicating this description, reference in the specification and drawings is generally made to personal computers and their operating systems. In this regard, a graphical applications program formed in accordance with this invention may, for example, run on Macintosh™, International Business Machine (IBM™) and IBM™ compatible personal computers. When used with IBM™ and IBM™ compatible personal computers, the operating system 24 may utilize a windowing environment such as Microsoft Windows™.

The graphical applications program 20 includes a user interface 28 that interacts with the operating system 24 through an application shell 30. Coupled between the user interface 28 and operating system 24 are a document engine 32, a graphics engine 34 and a constraint engine 36. Software program "engines" are generally defined as the portions of a program that determine how the program manages and manipulates data. The document engine 32 manages a display list that contains a list of all of the graphical elements in a document. In addition, the document engine 34 saves and continually updates an element database that includes a set of "values" for each graphical element. The values of a graphical element determines attributes such as its shape, size, color, etc. Throughout the specification and in the claims, the term "graphical element" is used to generally refer to display objects and other objects, for example, nonprinting objects, which may be manipulated by the graphical applications program. The graphics engine 34 utilizes the values stored within the element database of the document engine to render or display the graphical elements on a cathode-ray tube or other output device. Because the document engine 32 and graphics engine 34 can be implemented using technology that is generally known to those skilled in the art, the details of these engines are not described here.

FIG. 2 illustrates a subset of some of the graphical elements that may be created using the graphical applications program 20. Included are a rectangle 38, a circle 40, a line 42 and a distribution frame 44. The rectangle, circle and line are all printable display objects. The distribution frame 44 is a nonprintable graphical element that comprises an area surrounded by a boundary which is preferably rectangular in shape. A distribution frame is considered to be a nonprinting graphical element because it will only appear when the user is editing a document but will not appear when the document is sent to an output device. Graphical elements positioned within the distribution frame are governed by alignment and distribution criteria set up for the frame. The distribution frame 44 and its attributes are discussed more fully below.

With reference again to FIG. 1, the constraint engine 36 utilizes "links" to specify spatial relationships, i.e., constraints, between graphical elements. Spatial relationships between graphical elements may take on a variety of forms, and are specified by the user through the user interface. Links are generally not seen by the user and act as message carriers among graphical elements. Links can, however, be displayed and printed to allow the user to fully understand and control links that have been established between graphical elements. The links provide persistence between graphical elements, in that the constraint relationship imposed on two graphical elements by a link must be maintained throughout editing of the elements.

With reference to FIG. 3, a subset of four exemplary links are illustrated from the various links available in the graphical applications program. From left to right, the subset includes a distribute link 46, an align link 48, a size link 50 and a keep-apart link 52. The distribute link 46 is used to link graphical elements to a distribution frame. The align link 48 specifies how two graphical elements are to be aligned relative to one another. For example, the align link can be used to align two elements vertically by their centers. The size link 50 may be used to establish a size relationship such that if the size of one graphical element changes, the linked graphical element follows suit. The keep-apart link 52 is a constraint requiring that a specified distance be maintained between two graphical elements, but outside of this distance the elements can be freely moved relative to one another.

FIGS. 4A–4D illustrate an exemplary, three-element spatial arrangement within a document showing some of the constraint features of the graphical applications program 20. At the outset, it should be realized that the minimum number of links needed to couple N elements together is generally N–1, although a greater number of links may always be utilized, thereby adding additional constraint relationships between pairs of graphical elements.

Figure 4A:
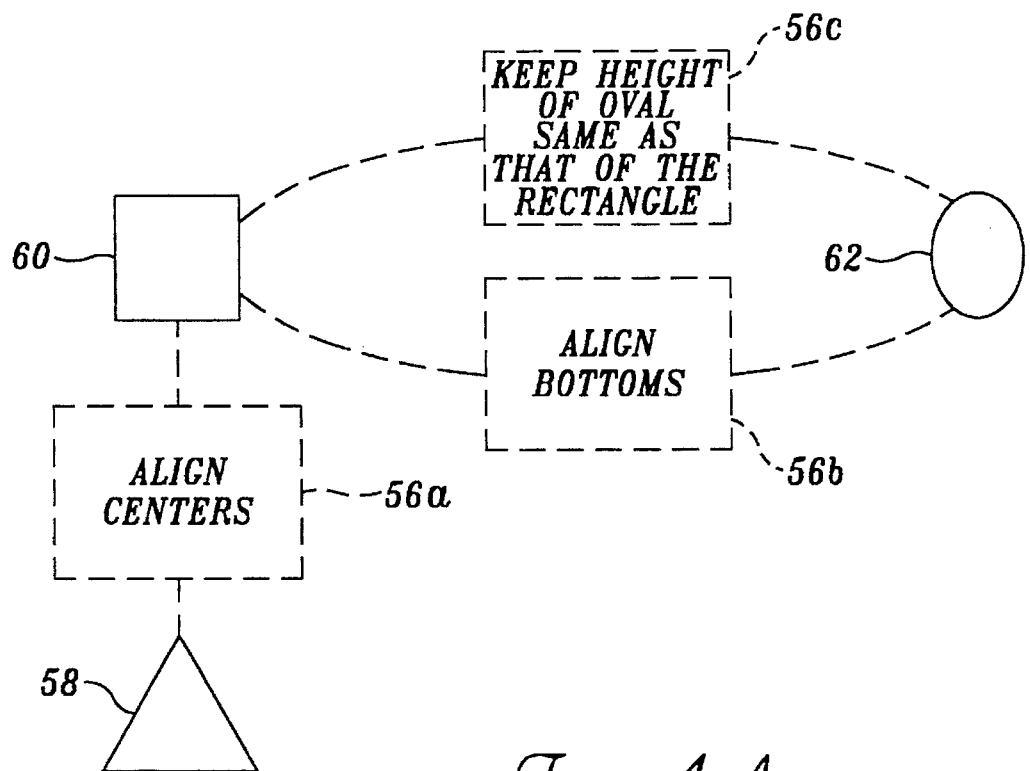
FIG. 4A is a pictorial diagram illustrating examples of the constraints that may be imposed on a set of graphical elements.

With reference to FIG. 4A, a set of three graphical elements—a triangle 58, a rectangle 60, and an oval 62—are coupled together through the spatial relationships specified with three links 56a, 56b and 56c. Each link 56 is represented by a dashed rectangle and line extending between the graphical elements. Link 56a couples the triangle 58 to the rectangle 60 by a constraint that requires that their centers remain vertically aligned. Thus, during editing of the document, any horizontal movement of the triangle 58 will be tracked by the rectangle 60, and vice versa. However, vertical movement of either graphical element will not affect the other because the centers remain aligned along the vertical axis. Links 56b and 56c couple the rectangle 60 to the oval 62. The constraint provided by link 56b is that the bottom portions of the frames bounding the rectangle and oval stay aligned with one another. The constraint imposed by link 56c is that the height of the oval 62 remain the same as that of the rectangle 60.

Figure 4B:
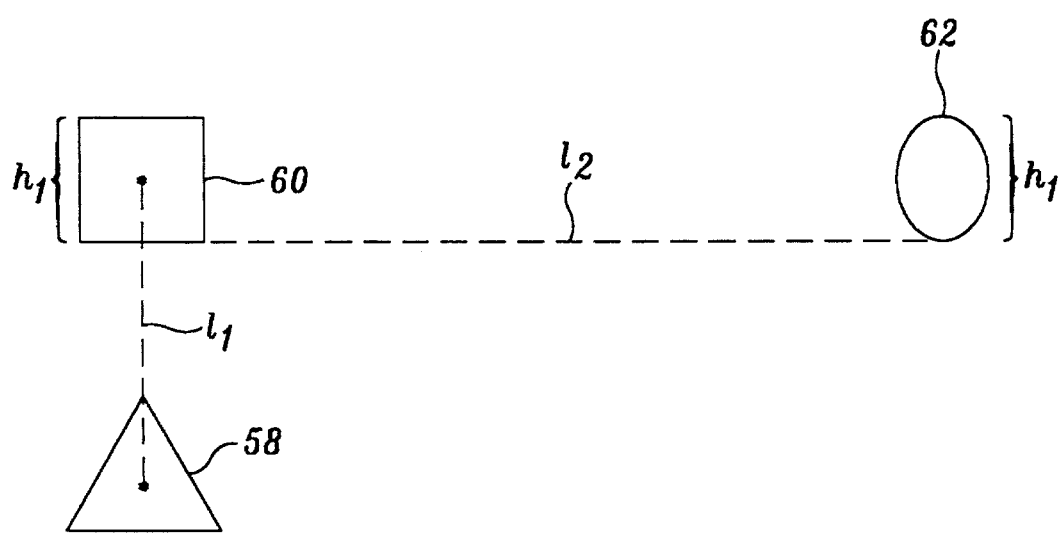
FIGS. 4B–4D are pictorial diagrams of the graphical elements depicted in FIG. 4A showing what occurs as a result of the imposed constraints.
Figure 4C:
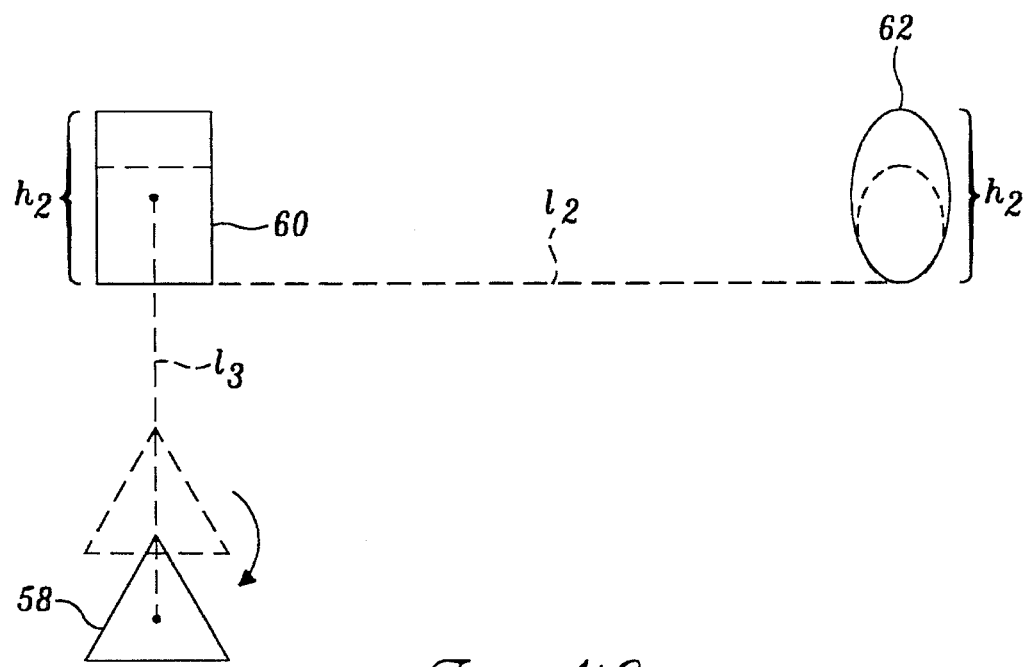
Figure 4D:
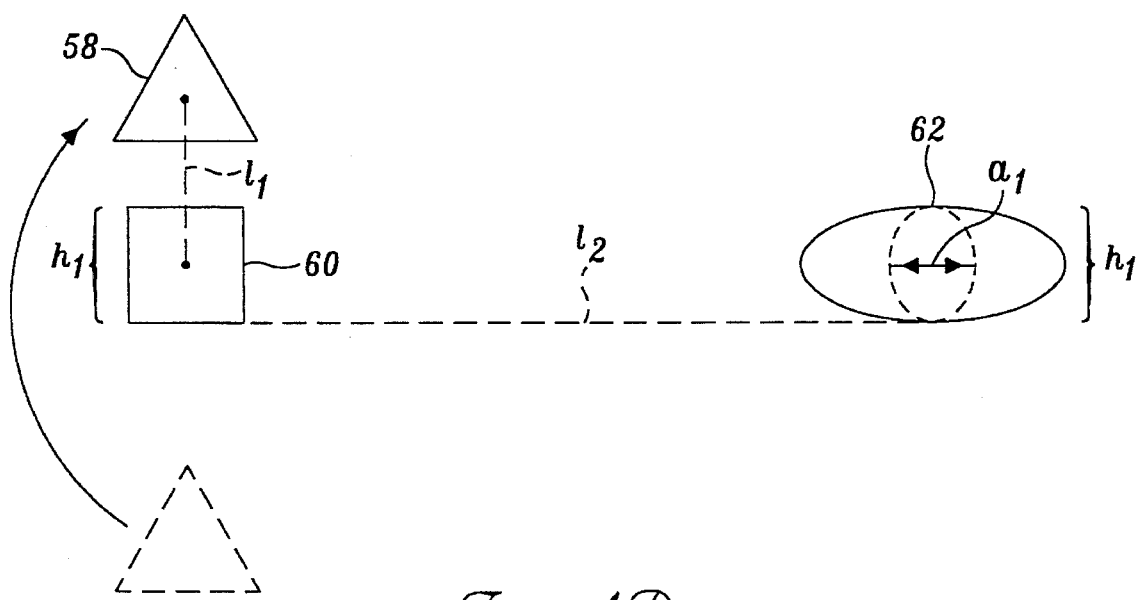

FIGS. 4B–4D depict three illustrative spatial configurations of the elements 54 which meet the constraints set up by the links in FIG. 4A. With reference to FIG. 4B, it is shown that all of the constraints of the links 56 have been met in that (a) the centers of the triangle 58 and rectangle 60 are aligned as shown by line $l_1$, (b) the bottom of the frame bounding each of the rectangle and oval 62 are aligned as indicated by the line 12, and (c) the height $h_1$ of the oval is the same as that of the rectangle.

With reference to FIG. 4C, two changes by the user are assumed. First, the height of the rectangle 60 has been increased from $h_1$ to $h_2$. As a result of the constraint imposed by link 56c, the height of the oval 62 "tracks" the increase, and is thus also $h_2$. Second, the user has moved the triangle 58 away from the rectangle, as is indicated by the line $l_3$. Because this movement has no effect on the vertical constraint, this movement has no effect on the other graphic elements.

In FIG. 4D, two of the graphical elements 54 have been moved in a way that has no effect on the other elements. First, the triangle 58 has been moved from below rectangle 60 to above the rectangle. Second, the shape of the oval 62 has been altered by extending what used to be the minor axis of the oval (axis $a_1$) horizontally such that the minor axis has become the major axis. The height $h_1$ of the oval remains constant due to the prohibition created by link 56c, assuming link 56c is a unidirectional link (discussed below).

Throughout the changes specified in FIGS. 4B–4D, the alignment of the graphical elements is maintained by the links 56 during the editing process and without the need to continuously apply realignment commands (as in prior art drawing programs). That is, while each of the changes shown are available in typical prior art drawing programs, the process required to make the changes is much more complicated. For example, instead of just extending the height of rectangle 60 upwardly as was done in FIG. 4C, and having the length of oval 62 change in a corresponding manner, first one or the other of the elements would have to be set to the desired height, second the nonset element would have to be set to the same height, and third a realignment command would have to be executed to ensure that the bottoms of the two elements were still aligned. Similarly, moving pairs of elements closer together or farther apart would also likely include more than one step, for example, the steps of first (a) changing the distance and then (b)realigning the graphical elements. As will be readily appreciated by those skilled in the art, the number of steps and realignment commands required to perform editing functions can become increasingly burdensome as additional graphical elements are added to a document.

Figure 5:
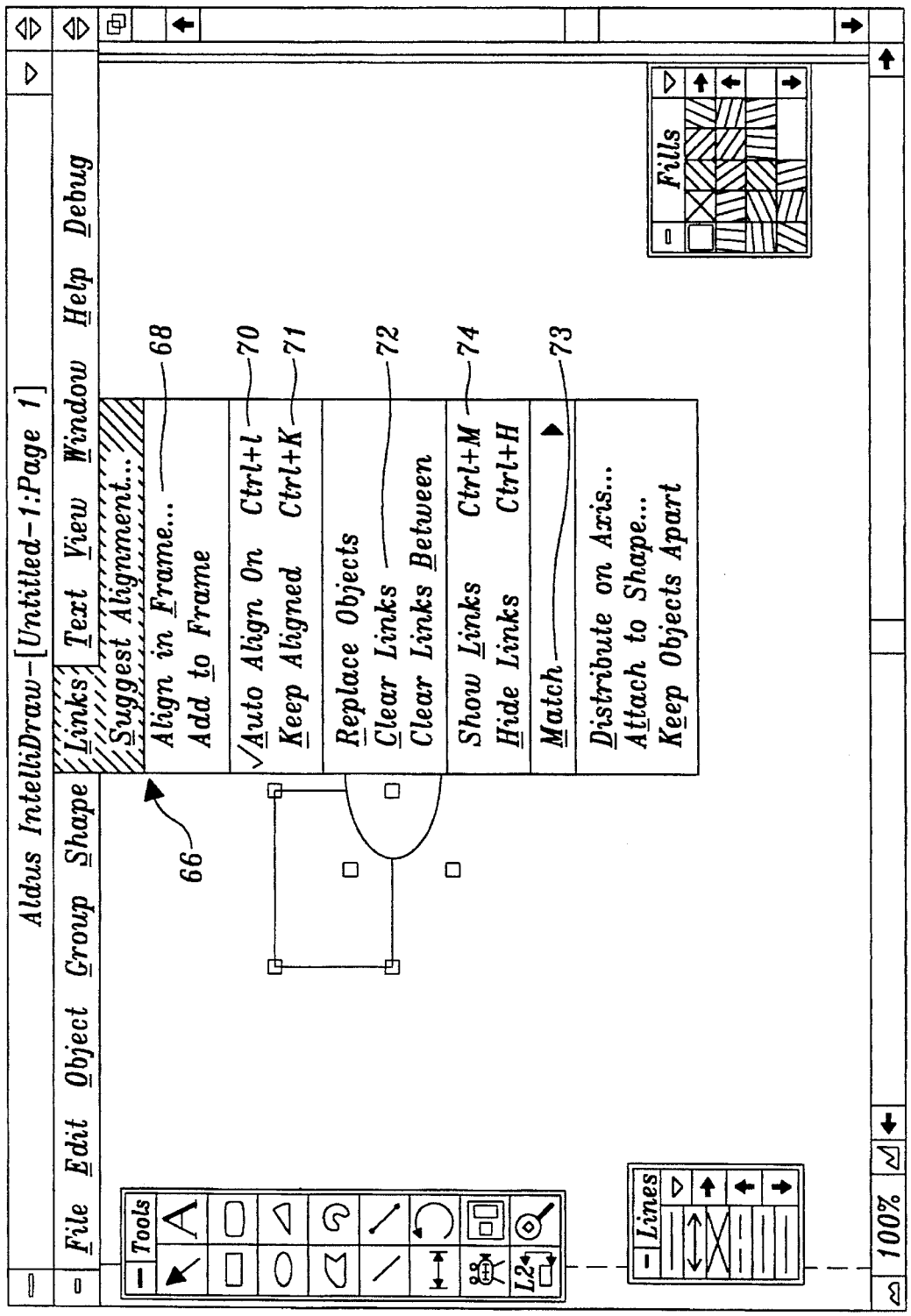
FIG. 5 is a pictorial representation of a link pull-down menu illustrating exemplary constraint features that may be implemented in accordance with the invention.

There are a number of other constraints provided by the invention that may be utilized to aid a user in desktop publishing and other graphic-related tasks that were not depicted in FIG. 3. It is desirable that the more beneficial constraints be incorporated as menu items, thereby providing ease of use and efficiency. In an actual embodiment of the invention, a number of constraint relationships in accordance with the invention have been implemented into a links pull-down menu 66 which is illustrated in FIG. 5.

As an aid in understanding the invention, selected menu items are discussed briefly. The align command in frame 68 is a feature of the graphical applications program that provides alignment options based upon the spatial relationships of two graphical elements that have been aligned by a user. An example of an alignment suggestion is that a first graphical element placed within a second graphical element should be centered in the second graphical element. The auto align on option 70 directs the graphical applications program to "snap" things into a perceived, user-desired alignment during drawing and editing. For example, if a user moves the edge of one graphical element to near vertical alignment with the edge of another graphical element, the graphical applications program will automatically align the edges vertically as long as they are within a programmed tolerance. The keep aligned command 71 allows a user to "lock" objects that have been aligned through the automatic alignment feature to create a link between the graphical elements, thereby forming a persistent constraint relationship that will remain throughout editing.

Figure 6:
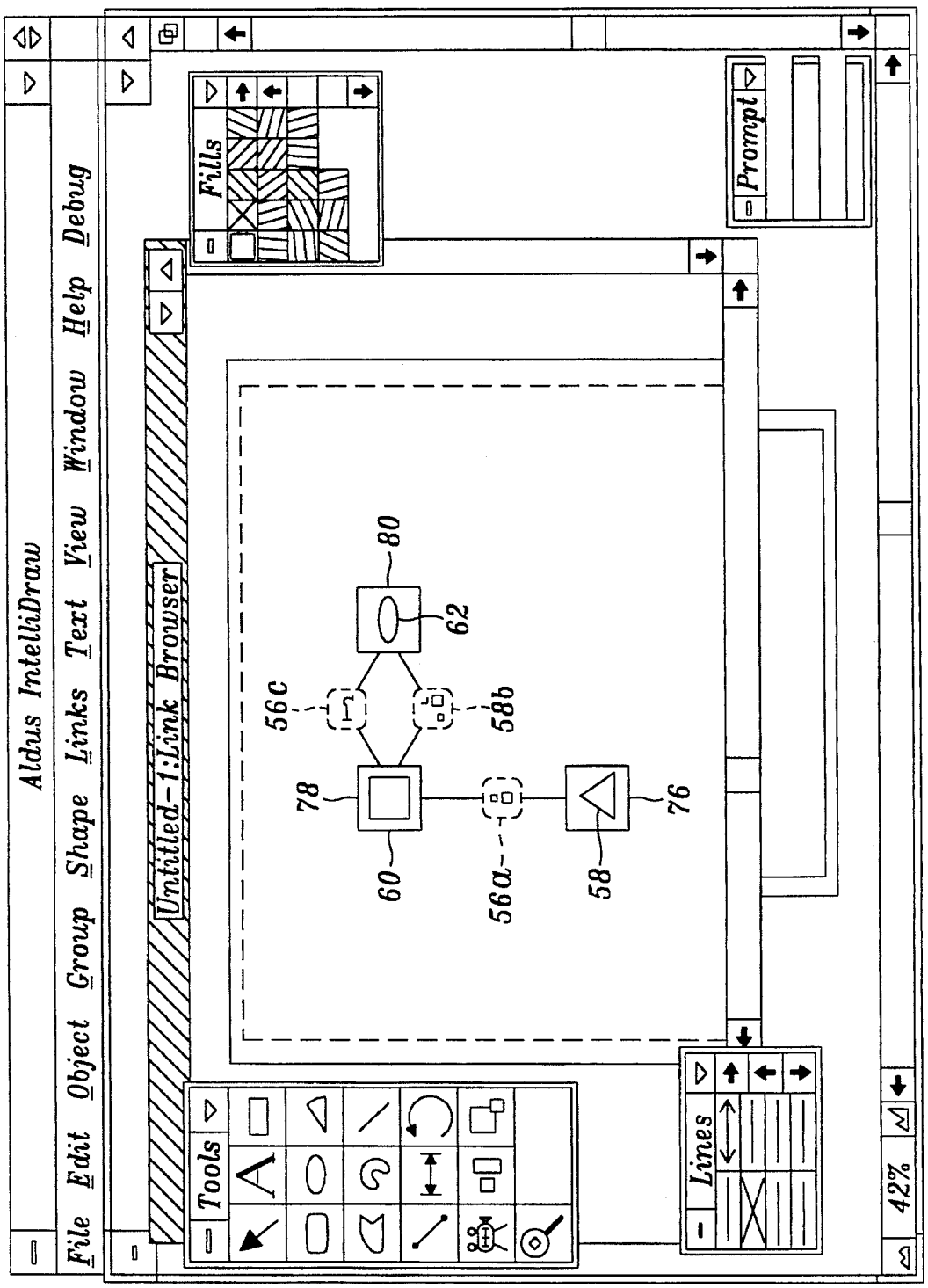
FIG. 6 is a pictorial representation of a Link Browser feature having the constraint relationships set forth in FIG. 4A.

The clear links command 72 provides a means for removing established links. The match command 73 is a method of setting up links between two or more graphical elements by matching, for example, element width, height, size, or text. The show links command 74 allows a user to see and subsequently edit links that have been created between a set of graphical elements. FIG. 6 (described below) illustrates what a user would actually see after executing this command on the set of graphical elements illustrated in FIGS. 4A–4D.

In FIG. 6, the triangle 58, rectangle 60, and oval 62 of FIGS. 4A–4D are represented by icons 76, 78, and 80, respectively. Link 56a is represented by an icon that includes two squares having their centers vertically aligned. The icon for link 56b depicts two squares that are aligned along their bottom edges. The icon for link 56c represents to the user that a "numerical" relationship exists between two graphical elements, such that the size of one element affects or controls the size of the other. In this manner, the graphical applications program provides a concise way (the use of icons) to communicate the links that have been established between graphical elements. Further, when a mouse is used, changing the attributes of a link is simply a matter of selecting (i.e., double clicking) the link to bring up a dialog box (not shown) and inputting new constraint criteria. Alternatively, suitable keyboard commands can be used.

Each link in the graphical applications program is either a unidirectional link or a bidirectional link. A unidirectional link establishes a constraint between two graphical elements such that the editing of a value or position of a first "master" element connected to the link controls the value or position, respectively, of the second "slave" element attached to the link. Thus, any change to the master element that affects the linked property (constraint) will change the slave element. Any attempt to change the slave element in a way that would affect the linked property is prohibited. An example of a unidirectional link is the link 56c shown in FIG. 4A. Link 56c requires that the height of a first element (rectangle 60) dictate the height of a second element (oval 62). Thus, during editing, as the height of rectangle 60 is varied by a user, the height of the oval 62 will track the variance accordingly. However, any attempt to change the height of the oval 62 will be blocked by the constraint.

A bidirectional link is a link in which the spatial relationship of two elements is interdependent upon one another, i.e., if either element in the relationship changes, the other element is modified to reflect that change. The interdependence of the elements is based upon the specific constraints set up by the link. In FIG. 4A, both links 56a and 56b are examples of bidirectional links since they are independent of either one of the graphical elements to which they relate. Considering link 56a, in order to satisfy the constraint that the centers of the elements be aligned, any movement of triangle 58 in a horizontal direction will also move rectangle 60 in that same direction and vice versa. In contrast, movement of triangle 58 in a vertical direction does not affect the position of rectangle 60 because vertical movement of triangle 58 will not affect the alignment of the centers of the elements. In other words, no constraint exists on vertical movement, only on horizontal movement.

The above discussion was directed toward establishing links between pairs of graphical elements. While large groups of graphical elements may be interconnected at an element-link-element level, making multiple changes to a group of elements that are linked at this level may become burdensome if each link in the group must be individually edited. To avoid this, the graphical applications program 20 includes a user interface tool that allows the spatial relationships of numerous graphical elements to be manipulated by changing the characteristics of a single, nonprinting graphical element. This graphical element is the distribution frame, which was discussed briefly in relation to FIG. 2.

A distribution frame defines a rectangularly-shaped area that may be used to link graphical elements within the frame such that alignment and distribution of the graphical elements are controlled by the distribution frame. This avoids the need for a user to be concerned with graphical elements on an element-link-element level. The size of the distribution frame is selected by the user, and may be edited at any time. The frame may be created and the graphical elements subsequently added to it, or the frame may be created to enclose existing graphical elements. When a distribution frame is created around a set of graphical elements, the elements are located in the frame as close to their current location as possible that will satisfy the alignment and distribution relationship specified for the frame.

Figure 7:
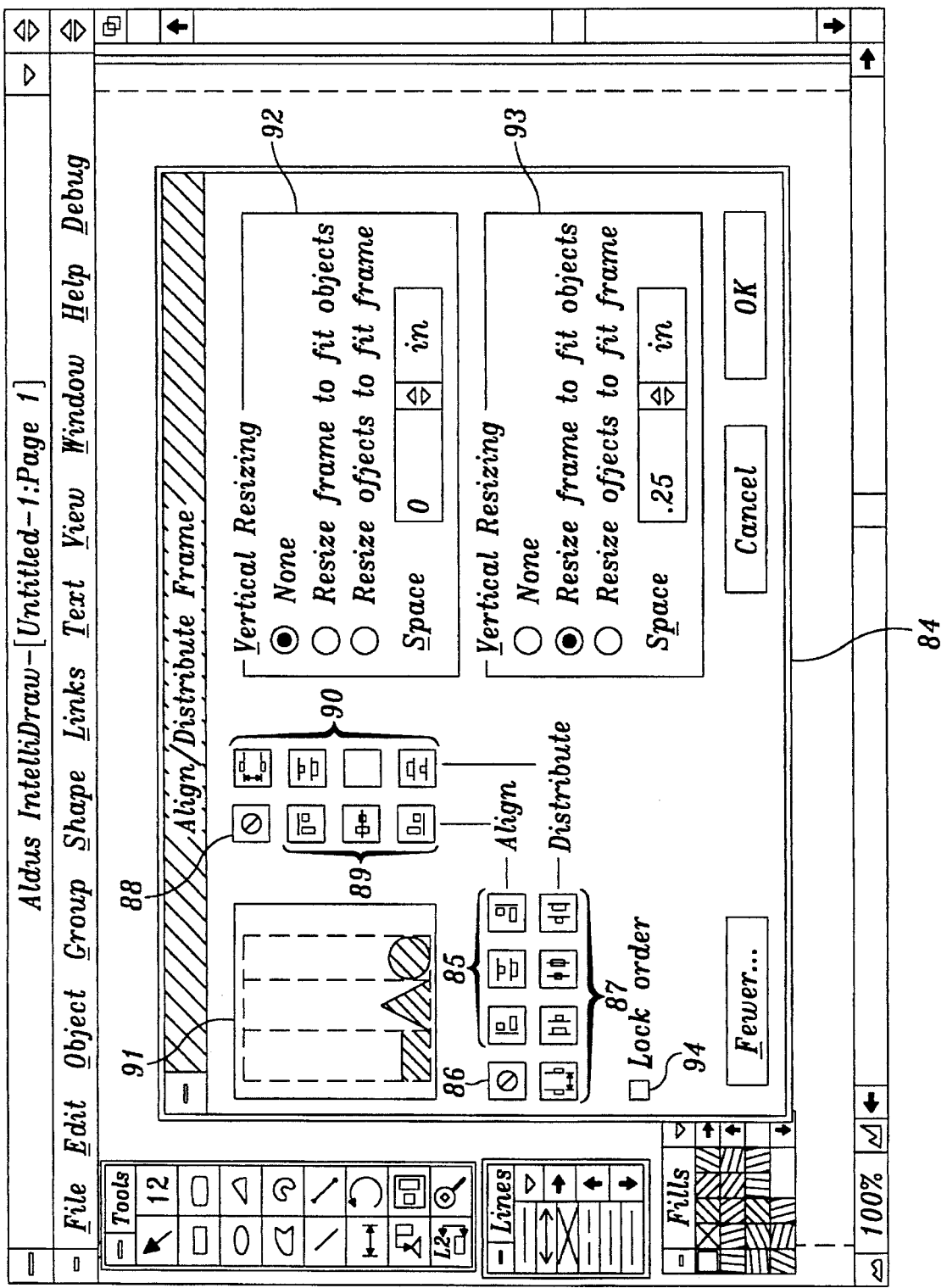
FIG. 7 is a pictorial representation of an Align/Distribute Frame dialog tool that may be used to create constraint relationships between graphical objects in accordance with the invention.

FIG. 7 depicts an Align/Distribute Frame (ADF) dialog box 84 from an actual embodiment of the graphical applications program that is used to set spatial criteria for graphical elements enclosed within a distribution frame. The ADF dialog box 84 illustrates exemplary "alignment" and "distribution" relationships that are available in the graphical applications program. Alignment (Align) refers to a graphical relationship between a set of elements that specifies how the elements are to be arranged or ordered. Distribution (Distribute) refers to a graphical relationship between a set of elements that specifies that the elements should be evenly spaced apart.

The ADF dialog box 84 includes eight horizontal criteria for specifying spatial relationships between graphical elements in the distribution frame. The criteria are illustrated by icons, including a horizontal null icon 85, an upper row 86 of horizontal alignment icons and a lower row 87 of horizontal distribution icons. There are also eight vertical criteria, including a vertical null icon 88, a column 89 of vertical alignment icons and a column 90 of vertical distribution icons. A preview box 91 within the ADF dialog box 84 indicates the effect of alignment and distribution selections. TABLE 1 presents an explanation of the icons in the ADF dialog box 84.

TABLE 1

Explanation of Icons Depicting Spatial Relations in the Align/Distribute Frame Dialog Box Horizontal Spatial Relationships:
  Null (icon 85)
    no horizontal alignment or distribution
  Align (row 86, left to right)
    (1) align left sides of elements
    (2) align centers of elements
    (3) align right sides of elements
  Distribute (row 87, left to right)
    (1) uniform space between element edges
    (2) uniform space between left element edges
    (3) uniform space between centers of elements
    (4) uniform space between right element edges
Vertical Spatial Relationships:
  Null (icon 88)
    no vertical alignment or distribution
  Align (column 89, left to right)
    (1) align tops of elements
    (2) align centers of elements
    (3) align bottoms of elements
  Distribute (column 90, top to bottom)
    (1) uniform space between element edges
    (2) uniform space between top element edges
    (3) uniform space between centers of elements
    (4) uniform space between bottom element edges The ADF dialog box 84 also includes vertical resizing 92 and horizontal resizing 93 options. Each resizing option 92 and 93 includes three mutually exclusive options: (1) none (no resizing desired in that direction), (2) resize frame to fit objects (graphical elements), (3) resize objects to fit frame. Under any of the resizing options, a distance between the graphical elements in the frame may be input to provide uniformity. The resizing options are advantageous from a number of standpoints. For example, often a user will have a predefined area in which graphical elements are to be placed. In this case, a user can adjust the distribution frame to be equal to the predefined area and use the resize objects command to have the graphical elements fill that area. The ADF dialog box 84 also includes a lock order option 94 that, when activated, prohibits the reordering of graphical elements.

Figure 8A:
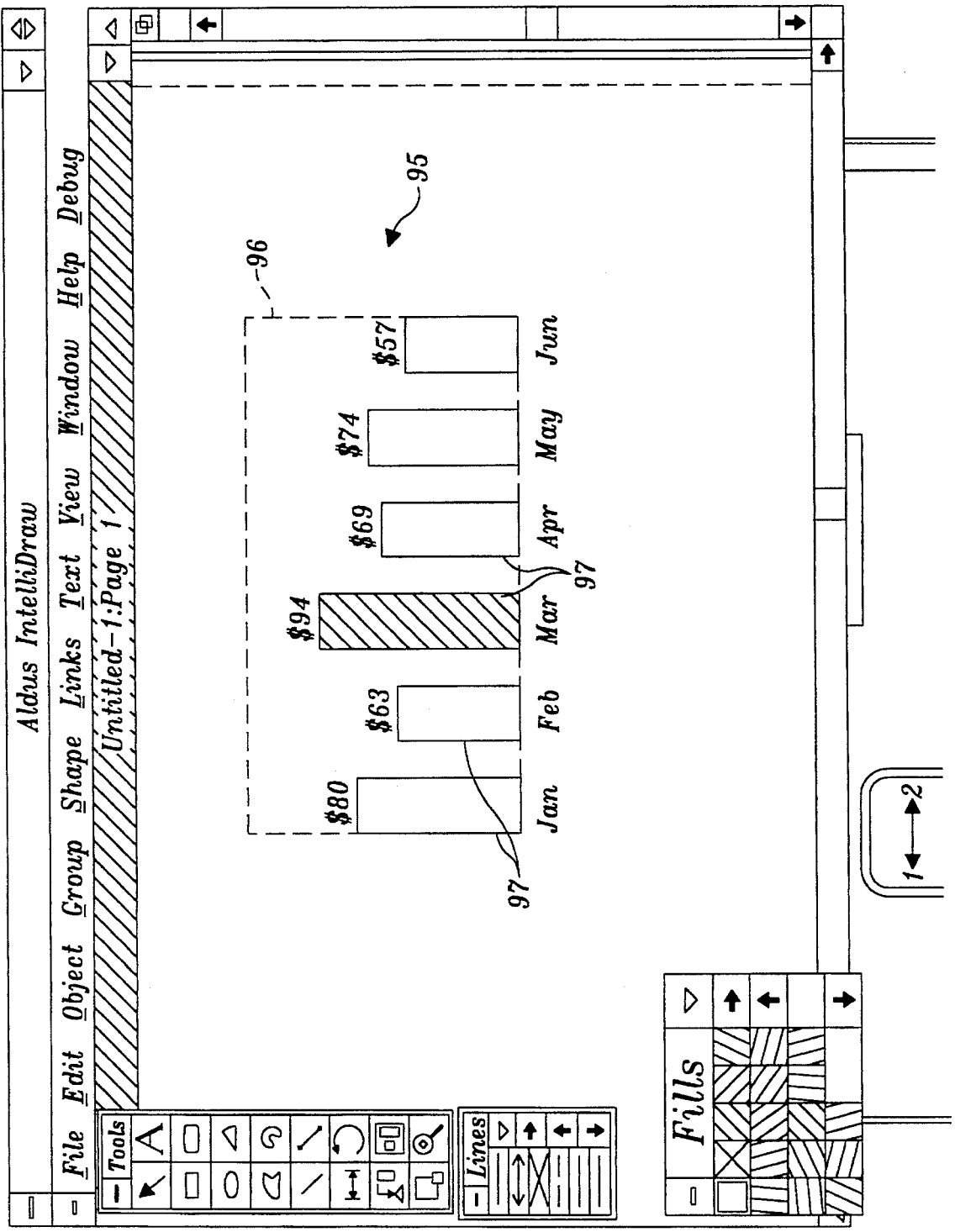
FIGS. 8A–8C illustrate a series of bar charts that may be created and edited using a distribution frame in accordance with the invention.
Figure 8B:
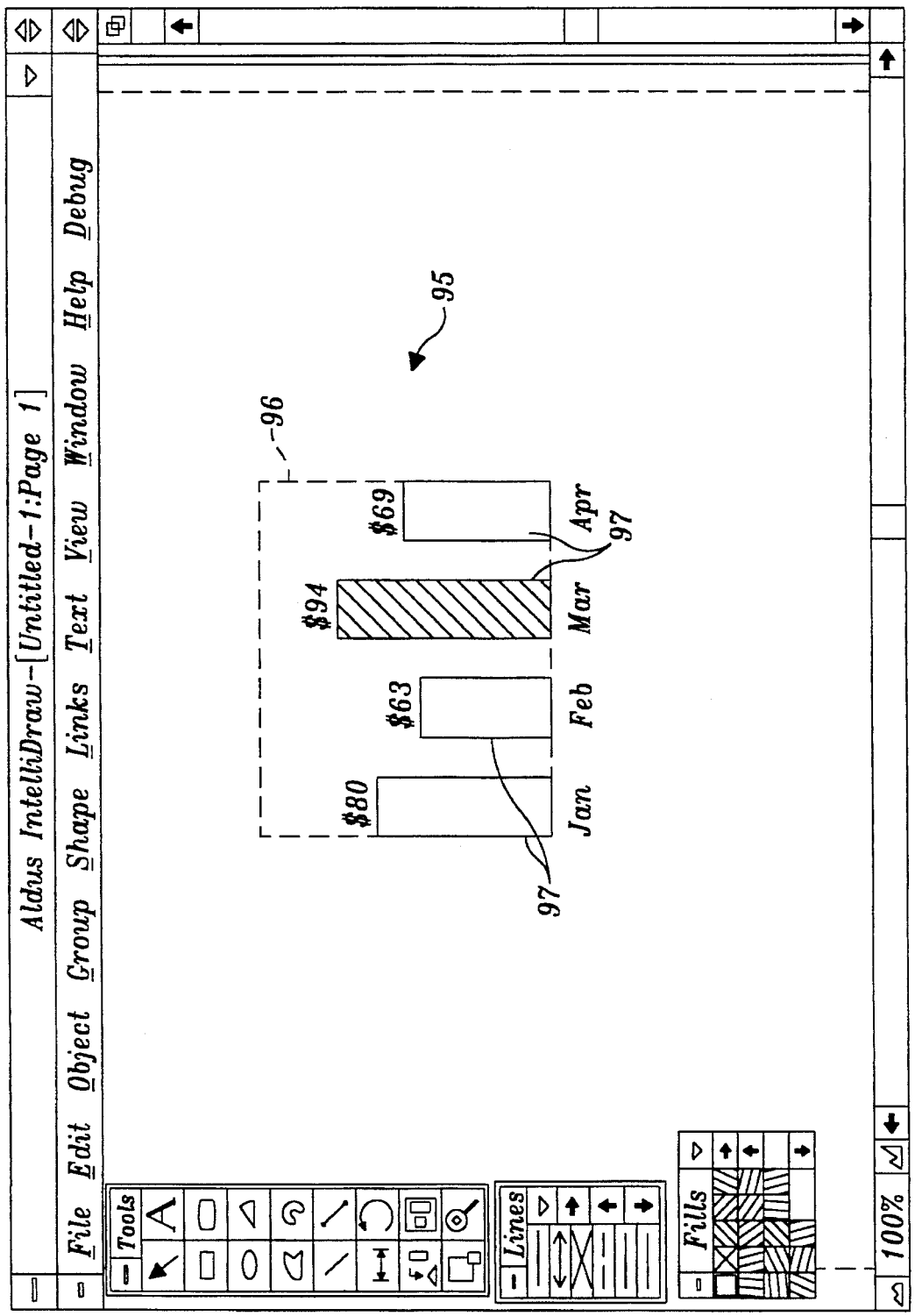
Figure 8C:
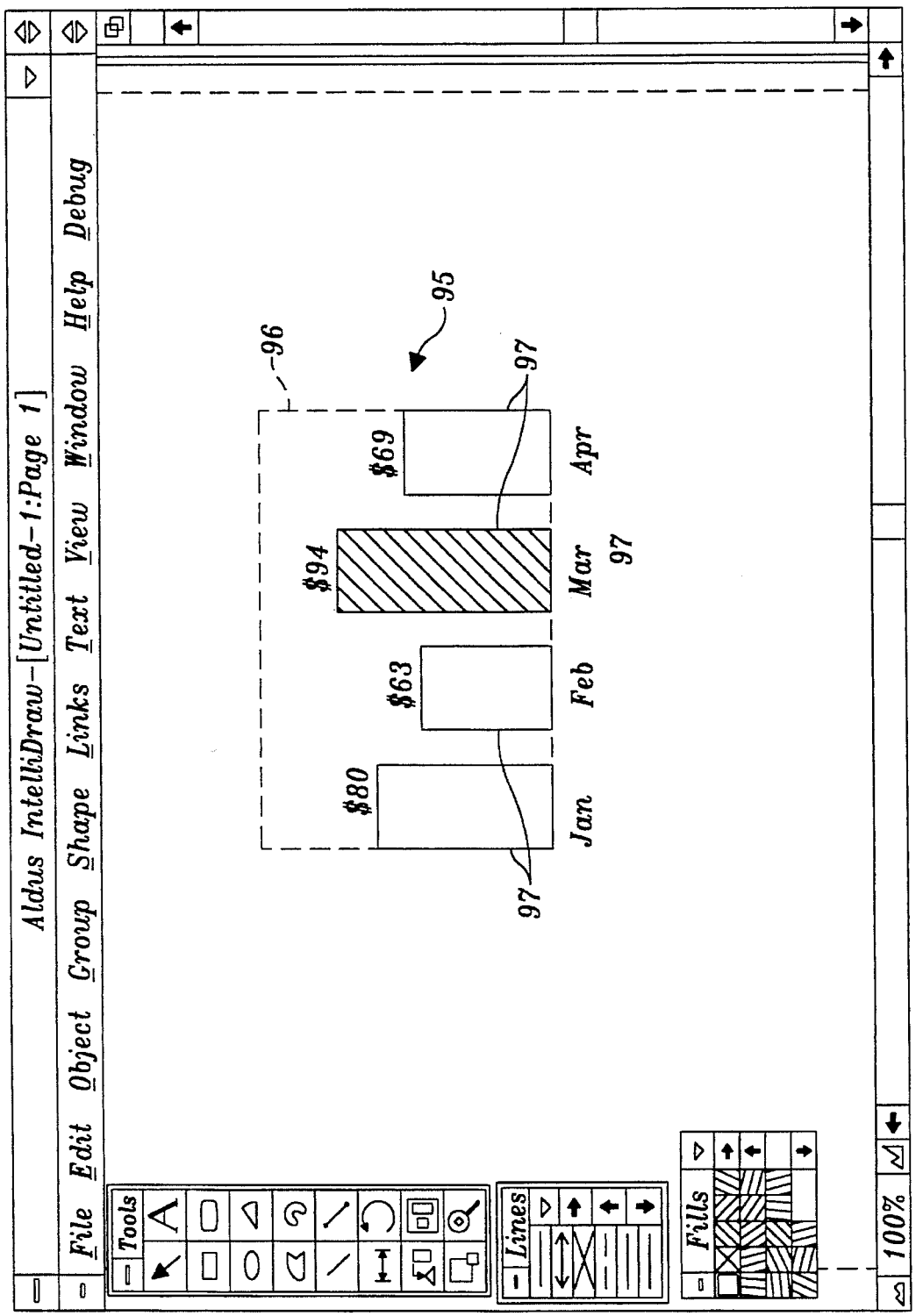

FIGS. 8A–8C illustrate a bar chart created using a distribution frame 96 in accordance with the invention. The distribution frame encloses six rectangular elements 97, each representing a different month for the months ranging from January to June. In FIG. 8A, the resize frame to fit objects option (horizontal) has been selected with a predetermined (for example, one-quarter inch) spacing between graphical elements.

As with any of the spatial relationship criteria, the resizing options are persistent in that they remain and automatically adjust the graphical elements or distribution frame during document editing. FIG. 8B illustrates this concept. Specifically, in FIG. 8B, the months of May and June have been deleted. In response, the graphical applications program has automatically resized the distribution frame 96 to enclose only the remaining graphical elements. In FIG. 8C, it is assumed that the user starts with the distribution frame 96 of FIG. 8A, only in this instance the resize objects to fit frame option (horizontal) has been selected. Thereafter, the months of May and June are once again deleted. In response, the graphical applications program automatically resizes the rectangular elements 97 to fill (horizontally) the distribution frame. It should be noted that the predetermined spacing between the graphical elements remains the same.

The distribution frame includes a number of inherent features that make it extremely advantageous in a graphics environment. One feature of the distribution frame is that it is very easy for a user to modify the alignment/distribution relationship between graphical elements. For example, in one embodiment all that is required is to double click on the distribution frame (using a mouse), bringing up the ADF dialog box shown in FIG. 7 and presenting options for redefining spatial relationships. Also, when a distribution frame is moved or resized, all the elements within the frame are moved or resized such that the elements maintain their relationship to the distribution frame. Another feature of the distribution frame is that a user can quickly change the order in which graphical elements are distributed by simply clicking on an object in the frame and dragging it to a new position. All of the elements are rearranged to make room for the new position of the dragged element. This feature can be defeated by choosing the lock order option.

With reference again to FIG. 1, the constraint engine 36 provides a means for solving spatial relationships between graphical elements by establishing and manipulating various links and/or distribution flames within a document. The constraint engine used in the graphical applications program 20 is preferably implemented using an object oriented programming language. Object oriented programming languages have the ability to efficiently define classes of objects and use these objects to improve the efficiency with which applications are developed, run, and maintained. In one actual embodiment, the constraint engine comprises a number of C++ classes, although other programming languages can also be used to implement the constraint engine.

There are three main classes of objects that comprise the constraint engine. These are listed at the top of TABLE 2 and include: (1) a Solver class, (2) a Link class, and (3) a Graphical Element class. Each class includes class attributes and methods which are used to interact with the remaining classes in the constraint engine. In TABLE 2, the attributes and methods for each class are listed below the corresponding class.

TABLE 2

Constraint Engine - Object Oriented Programming Classes, Attributes and Methods

| SOLVER | LINK | GRAPHICAL ELEMENT |
|---|---|---|
| Attributes: | Attributes: | Attribute: |
| Dirty List | Flags | Element Distance |
| Priority Lists | Source A | |
| List 1 - unidirectional links | Source B | Methods: |
| List 2 - bidirectional/forward links | Link Direction | Set (Value) |
| | A→B | Get (Value) |
| List 3 - bidirectional/ backward links | B→A | Element Set_Dirty |
| | A←→B | |
| List 4 - backward links coupled to a source node | Resolve Direction | |
| | A→B | |
| Current Distance | B→A | |
| Method: | Methods: | |
| Solve | Resolve_Link | |
| | Link Set_Dirty | |

As an aid in understanding the foregoing discussion, the following definitions are provided with respect to the terms of TABLE 2.

| | |
|---|---|
| Dirty List | A list of all of the links whose constraints might not be satisfied. A dirty list is created whenever a graphical element is added, deleted, moved or otherwise edited. See FIG. 9. |
| Priority Lists | A set of four lists (Lists 1–4) that indicate to the Solver those links in the dirty list that should be satisfied first. Links in List 1 have the highest priority and should be solved first. Links in List 4 are to be solved only when there are no remaining links to be solved in Lists 1–3. |
| Unidirectional Link | A link in which the constraint imposed by the links should always be resolved so that a specific graphical element is changed. For example, an A→B link would always change node B to satisfy the constraint. |
| Bidirectional Link | A link where either node may be changed to satisfy the constraint imposed by that link. |
| Source Node | A graphical element that was changed by the user's editing operation as opposed to one that was changed by link resolution within the graphical applications program. |
| Current Distance | A variable used in the Solve method to help determine which links should be solved first. |
| Solve | A method that (a) determines which links |

-continued

| | |
|---|---|
| | need to be resolved, (b) determines the resolve direction and (c) calls the Resolve_Links method. |
| Flags | Every link has a flag on each end labeled source A and source B which are used to determine link direction. The source A (B) flag is set if the graphical element at A (B) caused the link to be added to the dirty list. |
| Link Direction | Specifies which graphical element connected to a link can be changed to satisfy a constraint. |
| Resolve Direction | Specifies which graphical element should be changed to specify the constraint of a link. The direction is set by the Solve method. |
| Resolve_Link | A method for modifing one of the graphical elements attached to a link on the dirty list so that the constraint associated with the link is satisfied. |

-continued

| | |
|---|---|
| Link Set_Dirty | A method for adding a link to the dirty list. This method is called when the attributes of a link are edited. |
| Element Distance | The distance in graphical elements that an element is in relation to a source node. |
| Set_Value | The Set_Value has two functions. First, it is a method for modifying the value of an attribute of a graphical element. Second, it calls the Element Set_Dirty method which will add any links coupled to the edited graphical element to the dirty list. |
| Get_Value | A method for finding the value of an attribute of a graphical element. The Get and Set methods are the only access the Resolve_Link method has to the internals of a graphical element. The separation allows an application program to hide the internal implementation of a graphical element from the constraint engine. |
| Element Set_Dirty | A method for indicating that a graphical element has been edited such that the constraints imposed by the links coupled to that graphical element may no longer be valid. |

The graphical applications program includes a global routine that is continually checking for and able to identify modifications made to graphical elements within a document. Generally, the flow of the global routine is the following: (a)an edit is performed on a graphical element wherein Element Set_Dirty is called, thereby adding the links coupled to the edited graphical element to the dirty list; (b) the Solve method is called; and (c)the screen is updated to reflect the changes implemented by Solve and the methods called by Solve.

Figure 9:
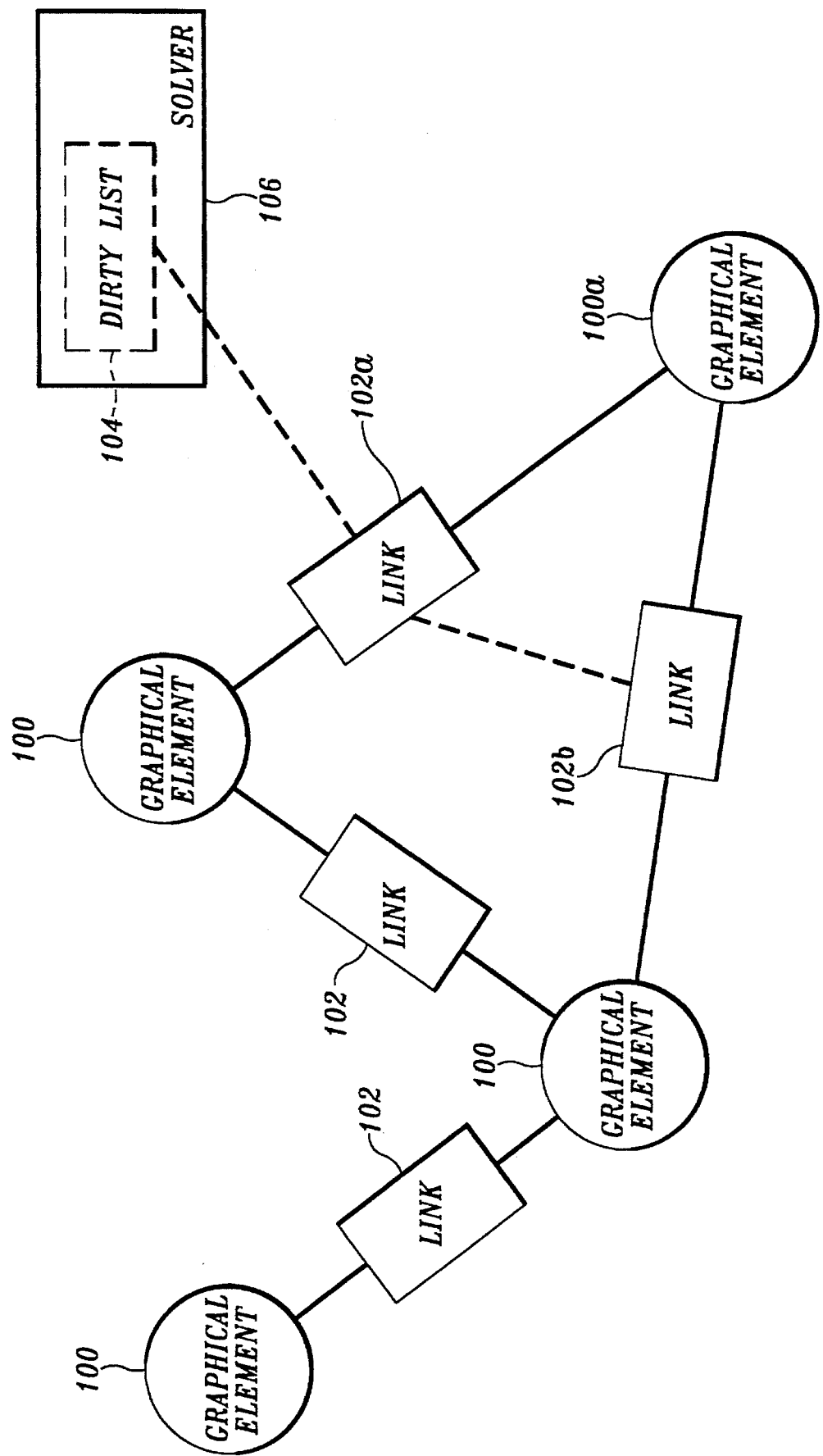
FIG. 9 is a constraint graph illustrating the addition of links to a dirty list after a graphical element has been edited.

The data structure used by the constraint engine is illustrated in FIG. 9. Four graphical elements 100 are shown coupled together by links 102. It is assumed that the rightmost graphical element 100a is in some respect edited by the user, for example, by moving or resizing the graphical element. As a result of the editing, the links 102a and 102b are added to a dirty list 104 by the Element Set_Dirty method. After the addition of the links to the dirty list, a call is made by the global routine to the Solve method of the Solver class 106. The Solve method subroutine of the graphical applications program is depicted in a flow diagram (FIG. 10) and described next.

At block 110, a test is made to determine if the dirty and priority lists are empty. If the lists are empty, a pass through the Solve method subroutine is unnecessary. As a result, the variable current distance is set equal to zero at block 112, and the subroutine is done. If the dirty and priority lists are not empty, the subroutine proceeds to block 114 where the current distance is incremented. At block 116 a test is made to determine if the dirty list is empty. If not, a loop formed by blocks 118, 120 and 122 is entered. The loop (a) assigns a link in the dirty list to one of the four priority lists, (b) assigns a resolve direction to the link (FIG. 11), and then (c) removes the assigned link from the dirty list. Links are assigned to the priority list according to the definitions provided in TABLE 2. Unidirectional links are always assigned to List 1. Bidirectional links are assigned to the remaining three lists based on element distances of the two graphical elements coupled to the link. Element distances are measured in relation to a source node, which is a graphical element that was edited by a user. Passes are made through the loop comprising test block 116 and blocks 118–122, until all of the links on the dirty list have been placed on one of the four priority lists. As a result, the dirty list is empty.

Figure 12:
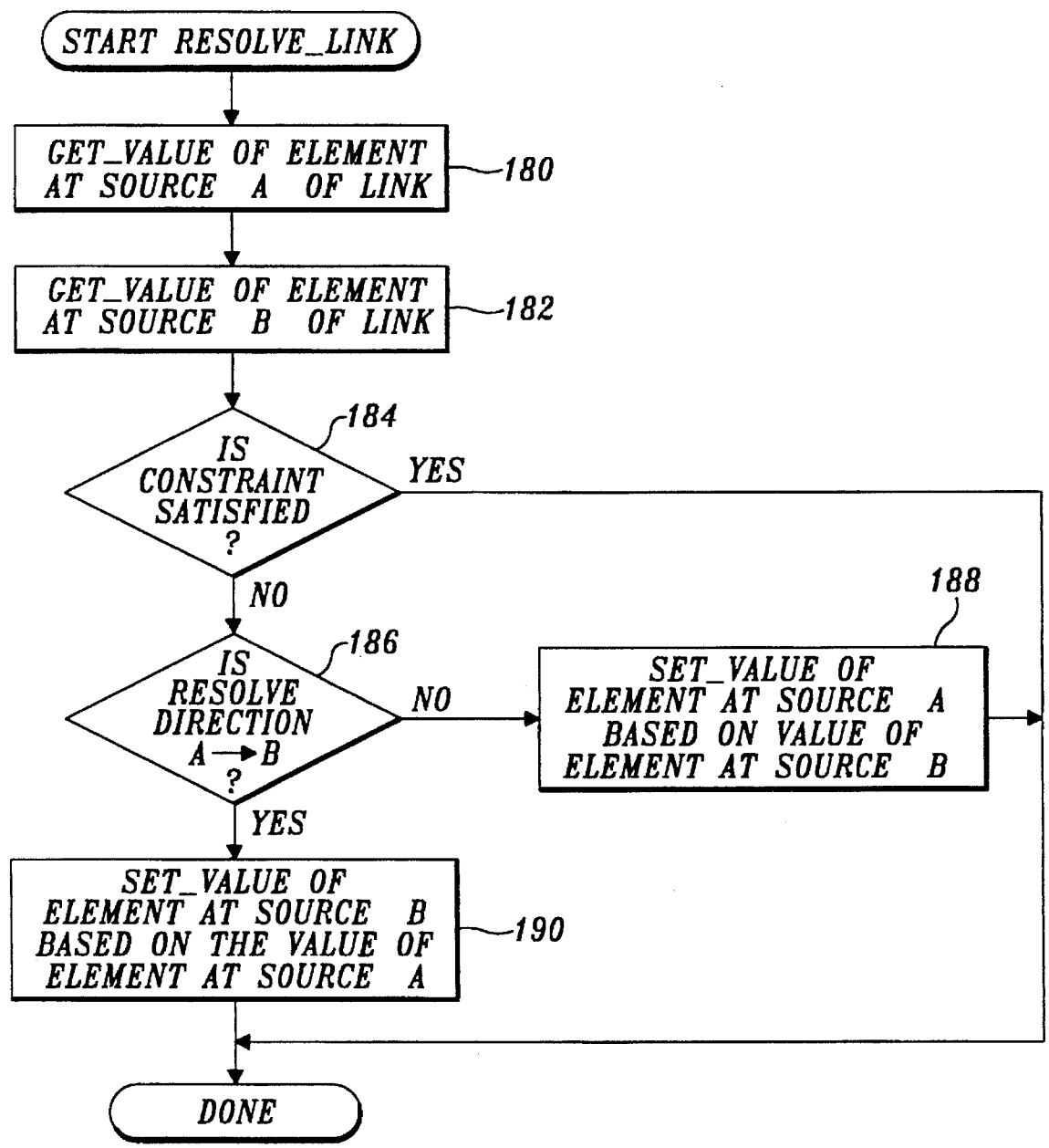
FIG. 12 is a flow diagram of a routine for determining which of two graphical elements coupled to a link should be modified to meet the link constraint.

Upon completion of the requisite number of passes through the loop, in block 126, the variable current list is set equal to the priority list that contains at least one link and has the highest priority. At block 128, a test is made to determine if the current priority list is empty. If not, a pass is made through a Resolve_Link subroutine at block 130. The Resolve_Link subroutine is illustrated in FIG. 12 and described below. After the pass through the Resolve_Link subroutine, at block 132, a test is made to determine whether the Solve method program is taking too long to solve the constraint. Block 132 is included because some constraints may be unsolvable or may simply take too much time to solve, with the solution being perhaps a few pixels off. If the time allotted is not up, the program loops back to block 128. If the allotted time has run, the links remaining in the priority lists are moved back onto the dirty list at block 134. Then at block 136 the current distance is set equal to zero. Thereafter, the program exits the Solve method subroutine.

Figure 10:
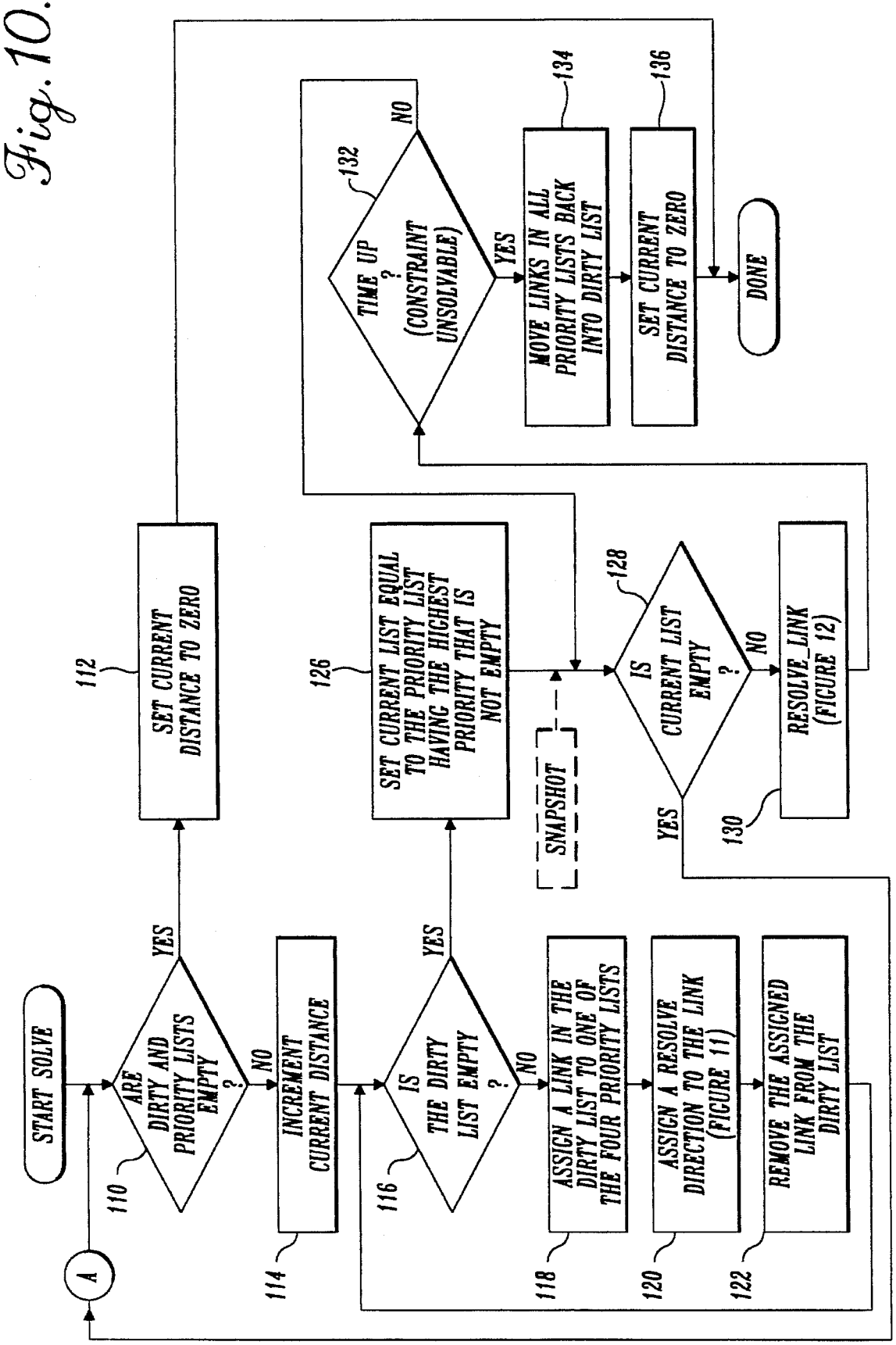
FIG. 10 is a flow chart of a routine by which constraints are solved in accordance with the invention.
Figure 11:
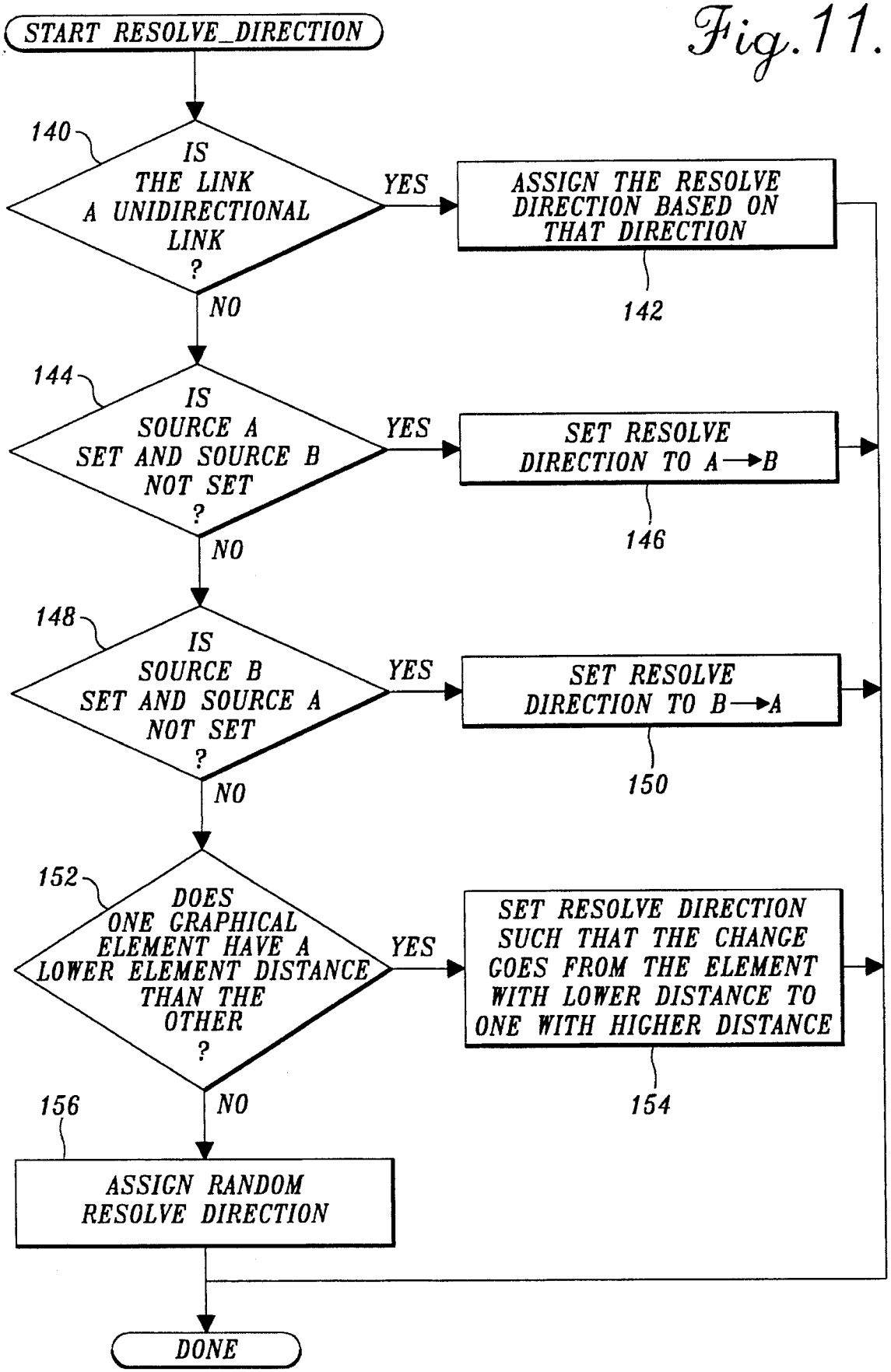
FIG. 11 is a flow chart of a routine for determining a resolve direction for any particular link.

FIG. 11 illustrates in more detail the assign resolve direction part (block 120) of the Solve method subroutine. At block 140, a test is made to determine if the link is a unidirectional link. If the link is a unidirectional link, the resolve direction is set to the direction of the link at block 142 and the program shifts to block 122 (FIG. 10). If not, a determination is made (block 144) as to whether source A of the link is set and source B is not set. If source A is set and source B is not set, the resolve direction is set to A→B at block 146, and the program shifts to block 122. Otherwise, a test is made to determine (block 148) whether source B is set and source A is not set. If source B is set and source A is not, the resolve direction is set to B→A at block 150 and the program shifts to block 122. Otherwise, at block 152, a test is made to determine whether one graphical element has a lower element distance than the other. If the determination is yes, the resolve direction is set at block 154 so that it points from the graphical element with a lower element distance to the graphical element with a higher element distance (i.e., such that the graphical element furthest from the source node will be changed). Then, the program shifts to block 122. If both graphical elements have the same distance, a random resolve direction is selected at block 156 and the program shifts to block 122.

FIG. 12 is a flow diagram illustrating the Resolve_Link part of the Solve method subroutine shown in FIG. 10. Resolve_Link changes either the value of the graphical object at source A of a link or at source B of a link so that the constraint specified by the link will be satisfied. The Solve method subroutine provides a resolve direction for each link as a parameter to Resolve_Link indicating which of the two graphical elements should be changed to satisfy the constraint imposed by the link. At block 180, a Get_Value procedure retrieves the value of the graphical element at source A of the link. At block 182, Get_Value retrieves the value of the graphical element at source B of the link. At block 184, a test is made to determine if the constraint imposed by the link is satisfied by comparing the value of the graphical element at source A to the value of the graphical element at source B. If the constraint is satisfied, Resolve_Link is done and the program shifts to block 132 (FIG. 10). If the constraint is not satisfied, the Resolve_Link proceeds to block 186.

At block 186, a test is made to determine if the resolve direction is A→B. If the resolve direction is not A→B (i.e., the direction is B→A), at block 188 the value of the graphical element at source A is set based on the value of the graphical element at source B in light of the constraint and the program ends. If the resolve direction is A→B, at block 190 the value of the graphical element at source B is set based on the value of the graphical element at source A. After the resolve direction has been set, the program shifts to block 132 of the Solve method subroutine (FIG. 10).

Figure 13:
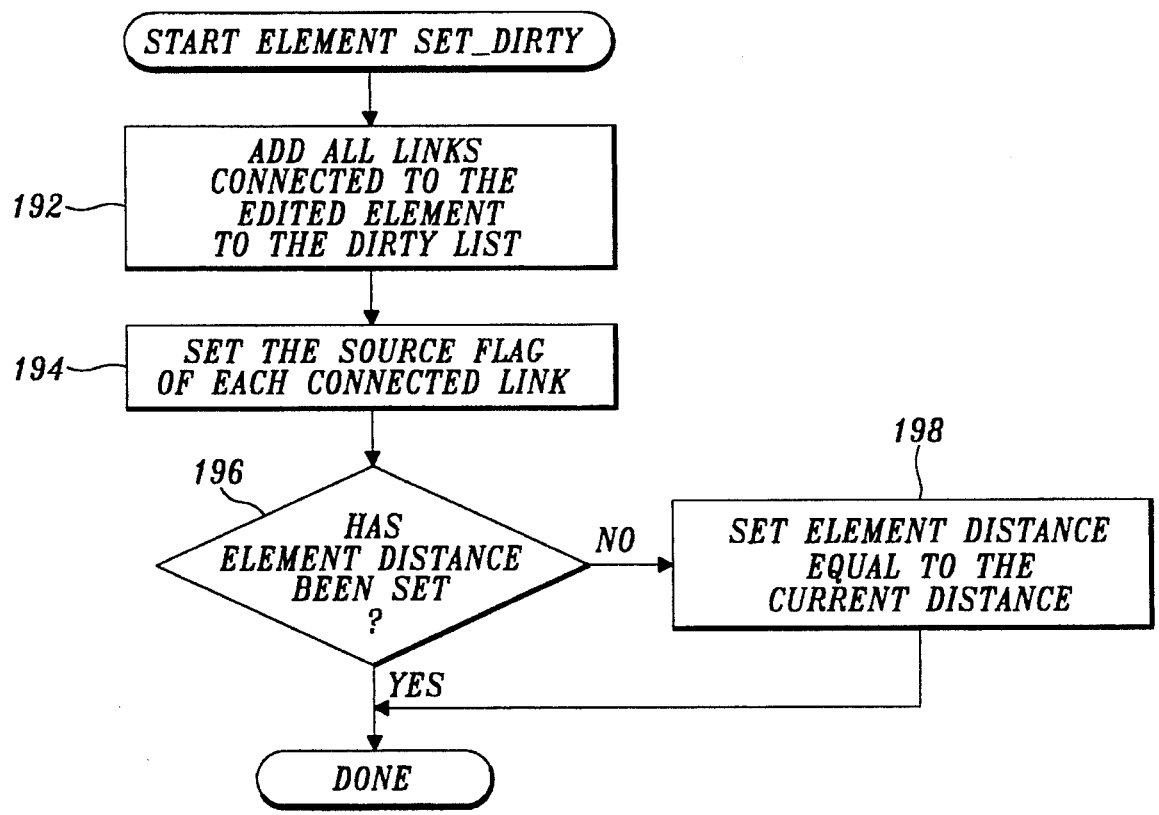
FIG. 13 is a flow diagram of a routine for adding graphical elements to the dirty list.

FIG. 13 is a flow diagram illustrating a subroutine suitable for carrying out the Set_Dirty method of the graphical applications program. At block 192, each link that is coupled to the edited graphical element is added to the dirty list. At block 194, a source flag (i.e., A or B) associated with each connected link is set. At block 196 a test is made to determine if the element distance has been set. If the element distance has been set, the subroutine ends. This indicates that the graphical element connected to the link has already been assigned an element distance from the source node. If the element distance has not been set, the element distance is set equal to the current distance (block 198) and the subroutine ends.

Figure 14:
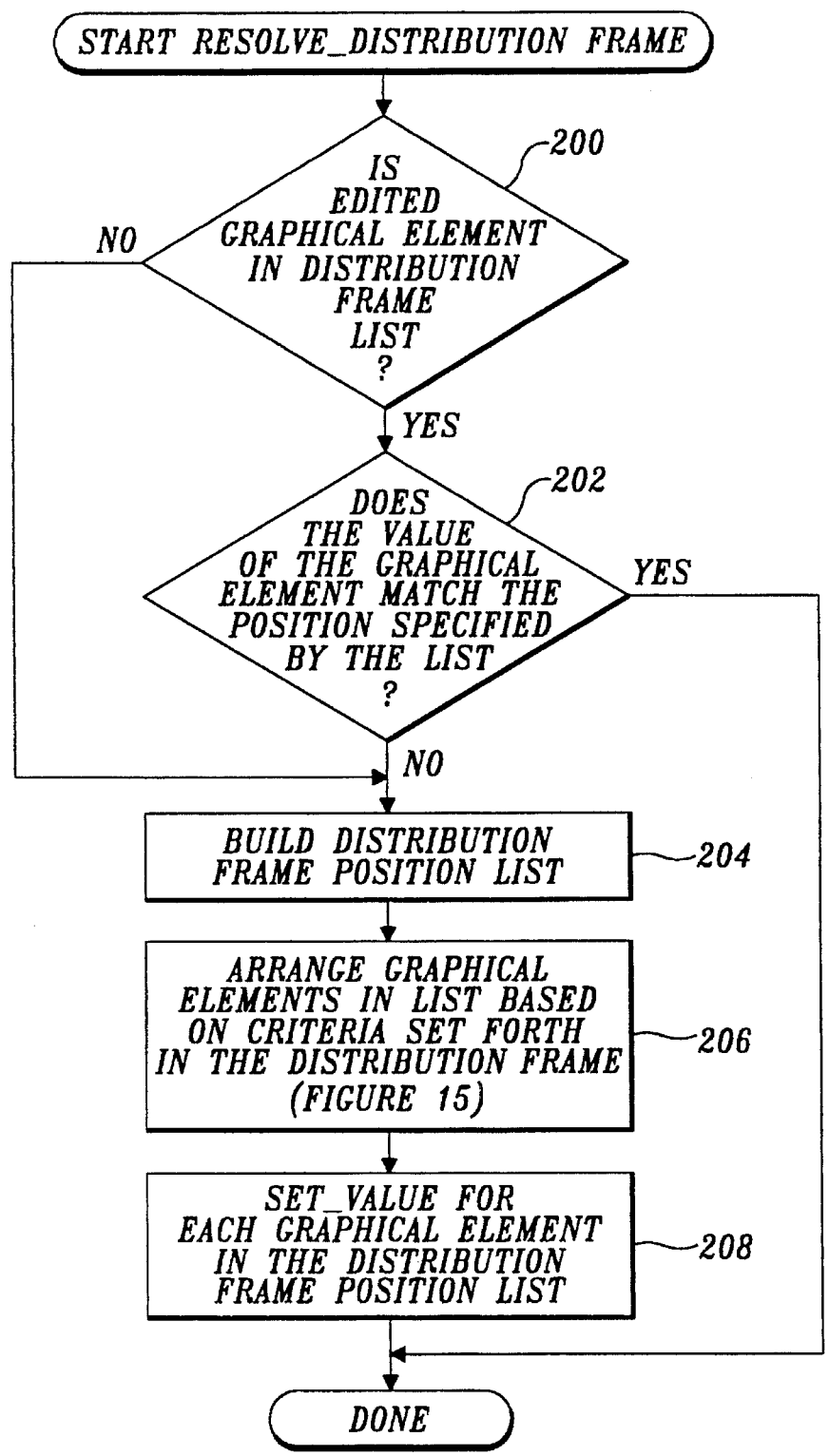
FIG. 14 is a flow diagram of a routine for resolving links that are coupled to a distribution frame.

FIG. 14 illustrates a subroutine for resolving links that are attached to a distribution frame. This method is called whenever a distribution frame is created or modified. The method may be called from a global routine or from the Solve method subroutine, although this call is not shown in FIG. 10. At block 200, a test is made to determine if an edited graphical element, for example, a newly added element or one that has been modified, is in the distribution frame element position list (frame position list). If the edited graphical element is not in the frame position list, the program jumps ahead to block 204. If the graphical element is in the frame position list, a test is made to determine (block 202) whether the value of the graphical element matches the position specified by the list. If the value and the position match, the subroutine ends. If there is not a match, the program proceeds to block 204.

At block 204, a new frame position list is built by including each graphical element that is attached to the distribution frame. Next, at block 206, the graphical elements are arranged based on criteria set forth in the distribution frame. Then, at block 208, the values for each graphical element in the position list are set. Thus, each graphical element is placed in the appropriate location and has the size specified by the position list. Then, the subroutine ends.

Figure 15:
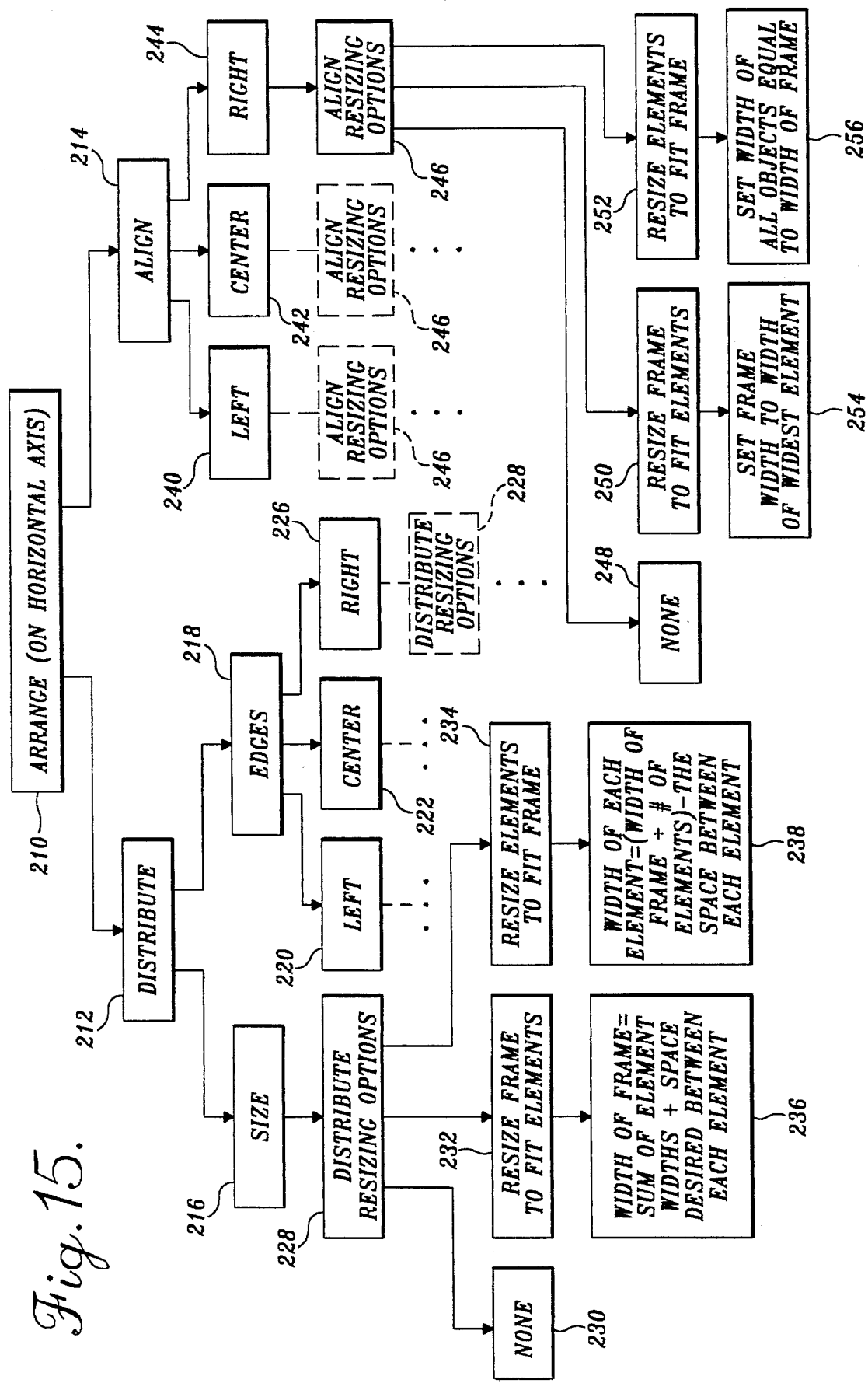
FIG. 15 is a hierarchical diagram illustrating the data flow used to arrange graphical elements that are linked to a distribution frame.

FIG. 14 is explained further in FIG. 15. The concepts underlining arrangement of graphical elements within the distribution frame stem from the vertical and horizontal alignment and distribution criteria generally set forth in FIG. 7 and described in TABLE 1. A general rule of arrangement is that the graphical element positions are chosen such that the movement of elements from their original locations is minimized.

FIG. 15 is a hierarchical block diagram addressing the arrangement of graphical elements on the horizontal axis. As will be appreciated, vertical element arrangement is similar. Extending downwardly from an arrange block 210 are the distribution and alignment options at blocks 212 and 214, respectively. The distribution of elements is broken into two categories: (a) distribution by size, as indicated by block 216, and (b) distribution via graphical element edges, as indicated by block 218. Distribution by size refers to evenly spacing the graphical elements regardless of individual element sizes The edges of graphical elements at block 218 may be aligned according to three attributes, the left edges of the elements (block 220), the centers of the elements (block 222), and the fight edges of the elements (block 226).

In addition to size and edge distribution arrangements, resizing options may also be selected to affect the graphical element arrangement. These are indicated at block 228, and include a no resizing option at block 230, a resize frame to fit elements option at block 232, and resize elements to fit frame option at block 234. If the user chooses to resize the frame to fit the elements enclosed in the frame, the width of the distribution frame will equal the sum of the element widths plus the desired space between each graphical element, as indicated at block 236. If the resize elements to fit the frame option is chosen, the width of each element will be set equal to (the width of the frame divided by the number of elements) minus the space between each element. This is indicated at block 238. The left, center and fight branches of the edges of block 218 include the same resizing options described in blocks 228–238.

The align block 214 also includes left, center and fight alignment options at blocks 240, 242, and 244, respectively. Resizing options for the align branch are indicated at blocks 246. These also include no resizing at block 248, resize frame to fit elements at block 250, and resize elements to fit frame at block 252. If the frame is resized to fit the elements, the frame width is set equal to the width of the widest element, as indicated at block 254. If the elements are being resized to fit the frame, the width of all of the objects is set equal to the width of the frame as indicated at block 256. Thus, FIG. 15 indicates in general terms the flow that may be used to arrange graphical elements based on criteria set forth in the ADF dialog tool.

Figure 16:
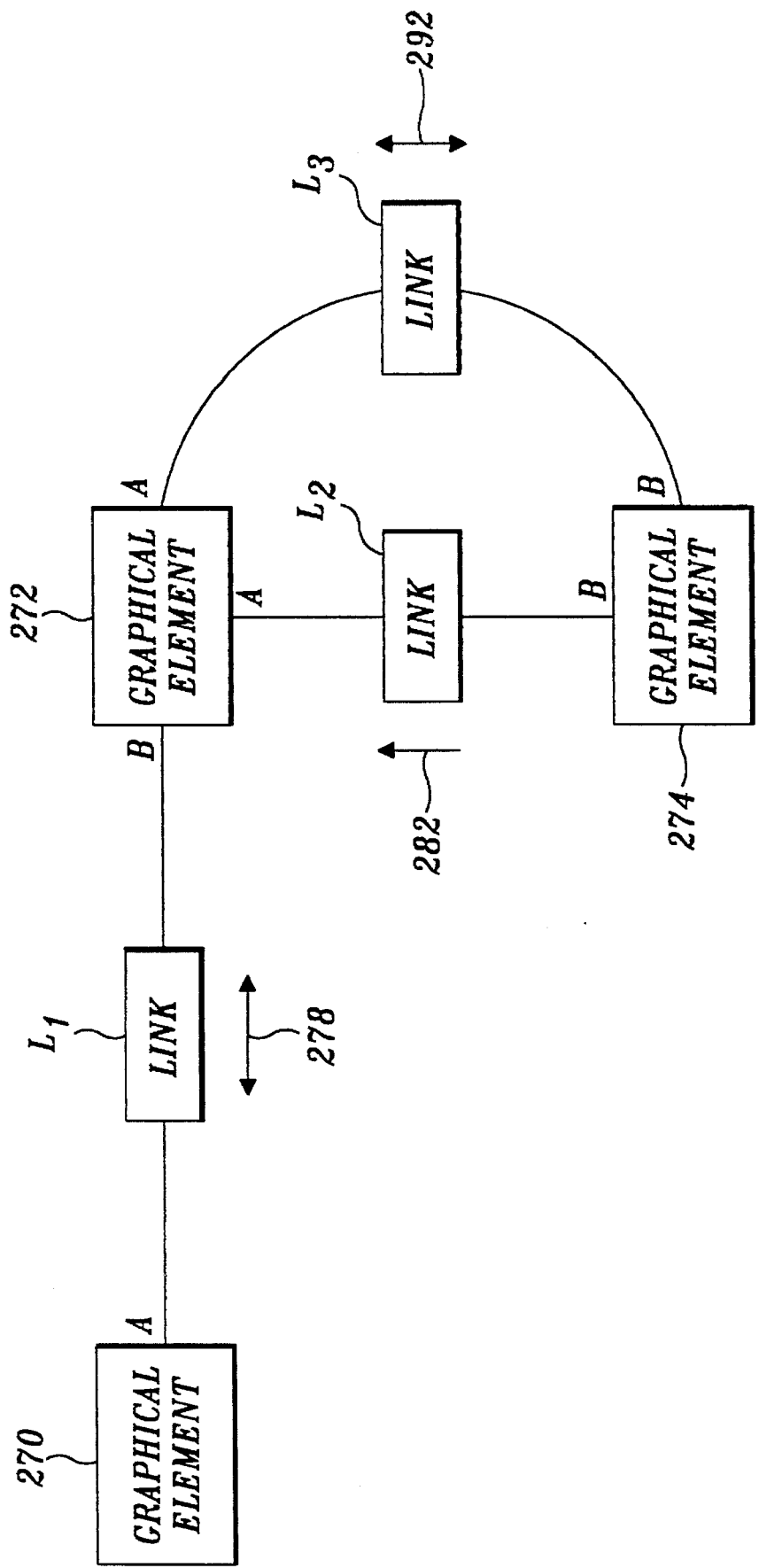
FIG. 16 is a block diagram of a set of graphical elements for use in explaining the operation of the constraint engine.

FIG. 16 is a block diagram of a set of three graphical elements 270, 272, and 274 that will be used to explain the operation of the constraint engine when taken in conjunction with the foregoing discussion. Graphical element 270 is linked to graphical element 272 by a link L1 having a source A at element 270 and a source B at element 272. The link L1 is assumed to be bidirectional, as is indicated by reference numeral 278. A unidirectional link L2 couples the graphical element 272 with the graphical element 274. The direction of the link is toward the graphical element 272, as is indicated by arrow 282. A third link L3 also couples the graphical elements 272 and 274. Link L3 is bidirectional (indicated by reference numeral 292) that has its source A coupled to graphical element 272 and source B coupled to graphical element 274.

This example references the flow diagrams illustrated in FIGS. 10–13. As was stated above, the graphical applications program includes a global routine that is continually checking for and able to identify modifications made to graphical elements in a document. In that regard, in FIG. 16 it is assumed that the graphical element 270 has been edited. The global routine performs the following steps: (1) perceives that the user has modified a graphical element and thus makes a call to element Set_Dirty (FIG. 13), (2) makes a call to the Solve method subroutine within the constraint engine, and (3) updates the screen, thereby displaying the modifications made to the document. Throughout this example, a snapshot will be taken immediately after block 126 of the Solve method (FIG. 10) to: (a) indicate the resolve direction of any links that are in one of the four priority lists, (b) indicate which priority list they are in, and (c) indicate the value of the variable current distance. These snapshots are illustrated in TABLE 3.

TABLE 3

Snapshots of Solve Method

| | Resolve Direction | Priority List | Current Distance |
| --- | --- | --- | --- |
| Snapshot 1 | A→B (Link L1) | 2 (Link L1) | 1 |
| Snapshot 2 | B→A (Link L2) | 1 (Link L2) | 2 |
| | A→B (Link L3) | 2 (Link L3) | |
| Snapshot 3 | B→A (Link L1) | 4 (Link L1) | 3 |
| | A→B (Link L3) | 2 (Link L3) | |
| Snapshot 4 | B→A (Link L1) | 4 (Link L1) | 4 |
| | A→B (Link L2) | 1 (Link L2) | |
| Snapshot 5 | B→A (Link L1) | 4 (Link L1) | 5 |

Upon calling Element Set_Dirty, link L1 is added to the dirty list and the source A of link L1 is set in blocks 192 and 194 of that routine. A call is then made to solve, wherein the current distance is set to one at block 114, link L1 is added to Priority List 2 and the resolve direction for link L1 is set to A→B at block 120. This yields the data found in snapshot 1 of TABLE 3.

At block 128, Resolve_Link is called and the graphical element 270 is compared to the graphical element 272 to see if the constraint of link L1 is satisfied. Assuming that the constraint of link L1 is not satisfied, Set_Value is called at block 190 wherein the graphical element 272 will be set based upon the value of graphical element 270. Thereafter, the Set_Value method calls Element Set_Dirty where, at block 192, link L2 and link L3 are added to the dirty list and the source flags that are coupled to graphical element 272 (A in both cases) are set. Control is then returned to Solve, which loops back to block 110. At block 114, the current distance is incremented to two. In the loop 116–122, link L2 is assigned to List 1 and set with a resolve direction B→A. Also in this loop, link L3 is added to List 2, and its resolve direction is set to A→B. At block 126, the current list is set equal to List 1. The snapshot 2 at TABLE 3 indicates the current status of the links present in the priority lists.

At block 130, the Resolve_Link routine is called, where the constraints between graphical elements 272 and 274 are tested at block 184. Assuming the constraint is not satisfied, the value of the element 274 will be set equal to the value of the element 272 at block 188. The Set_Value method will again call Element Set_Dirty, which will add link L1 to the dirty list, because graphical element 272 was modified. Control returns to the Solve method where the current distance is incremented to three and link L1 is added to List 4. Further, at block 120 a resolve direction of B→A is set for link L1. At block 126, the current list is set equal to List 2 as it is the highest priority list that is not empty. The current state of the example is evidenced at snapshot 3 in TABLE 3.

At this point, the current list (List 2) is not empty, and Resolve_Link is called at block 130. At block 184 of Resolve_Link, it is determined whether the constraint of link L3 is satisfied by comparing the value of graphical element 272 to graphical element 274. Assuming that the constraint is not satisfied, the value of graphical element 274 is changed based on the value of element 272. Thereafter, element Set_Dirty is called and link L2 is added to the dirty list. Control is then returned to block 128 of the Solve method, which branches to block 110. The current distance is incremented to four at block 114 and link L2 is added to List 1 in blocks 116–122. The current list is then set equal to List 1 at block 126. The current status of the variables of interest is at snapshot 4 of TABLE 3. Resolve Link is called at block 130.

In the Resolve_Link routine, it is assumed for this example that the constraint is satisfied and control is returned to the Solve method. While there are no links in the dirty list at this point, link L1 is still in List 4, and thus the program continues to block 114 where the current distance is incremented to 5. Flow continues to block 126, where the current list is set equal to List 4. At this point, the snapshot 5 indicates the current status of the resolve direction, priority lists, and current distance. The program continues to block 130, where Resolve_Link is called. At block 184, the value of graphical element 272 is compared to the value of graphical element 270. At this point, it is assumed that the constraint of link L1 is satisfied, and control returns to the Solve method. The Solve method loops back to block 110, wherein the dirty and priority lists are empty. Thus, the program continues to block 112 where the current distance is set equal to zero and the program terminates.

The constraint engine is a very efficient means for solving constraints. Constraint solvers used in other arts typically have a planning stage that preplans the ordering of constraints by looking at the constraints specified by different values. It is thus the preplanning stage that develops an evaluation order for the constraints. In contrast, the constraint engine of the invention essentially "plans" as it solves constraints, through the use of the priority lists, element distance values and link directions.

The constraint engine is also advantageous in that it provides incremental and partial solutions to constraint problems. Incremental solutions can be provided in that the way the Dirty_List is implemented, the Solve method can be stopped at any time for a partial solution to a constraint problem. There is no overhead in setup or cleanup time for starting or stopping the Solve method. Partial solutions are provided in that if the Solve method takes too long to find a solution or there is no solution, a partial solution is presented to the user. Further advantages of the constraint engine are that graphical element internals are hidden from the constraints. This is because the only access to the internals of graphical elements is through the Get_Value and Set_Value methods. Finally, the constraint internals are hidden in that the only access by the Solve method to the constraints is through the Resolve_Link method. This makes the implementation of constraints very flexible.

While a preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of establishing spatial relationships between two graphical elements displayed on a page in response to a user's input, each graphical element having a size and a position on the page, comprising:

(a) selecting a first, master, graphical element in response to user input;

(b) selecting a second, slave, graphical element in response to user input;

(c) establishing, in response to user input, a constraint relationship between the master and slave graphical elements that links the size of the master element to the size of the slave element wherein the constraint relationship between the master and slave elements is maintained throughout editing of the elements by the user; and (d) automatically monitoring any user-initiated attempts to edit the size of either the master or slave elements which affect the constraint relationship therebetween; and (i) if an edit to the size of the master element affecting the constraint relationship is attempted, then modifying the size of both the master and the slave elements in accordance with the constraint relationship; or (ii) if an edit to the size of the slave element affecting the constraint relationship is attempted, then inhibiting the attempt to edit the size of the slave element.

2. The method of claim 1, wherein each graphical element has dimensional attributes that determine a shape, size, and color of the graphical element.

3. The method of claim 1, wherein the constraint relationship further includes linking a height of the slave element to a height of the master element.

4. The method of claim 1, wherein the constraint relationship further includes linking a width of the slave element to a width of the master element.

5. The method of claim 1, wherein the constraint relationship includes aligning the graphical elements along a vertical axis.

6. The method of claim 1, wherein the constraint relationship includes aligning the graphical elements along a horizontal axis.

7. A method of establishing spatial relationships between two graphical elements displayed on a page in response to a user's input, each graphical element having dimensional attributes and a position on the page, comprising:

(a) selecting a first, master, graphical element in response to user input;

(b) selecting a second, slave, graphical element in response to user input;

(c) establishing, in response to user input, a constraint relationship between the master and slave graphical elements that links the attributes or position of the master element to the attributes or position, respectively, of the slave element wherein the constraint relationship between the master and slave elements is maintained throughout editing of the elements by the user;

(d) automatically monitoring any user-initiated attempts to edit the attributes or position of either the master or slave elements which affect the constraint relationship therebetween; and (i) if an edit to the attributes or position of the master element affecting the constraint is attempted, then modifying the attribute or position, respectively, of both the master and the slave elements in accordance with the constraint; or (ii) if an edit to the attributes or position of the slave element affecting the constraint is attempted, then inhibiting the attempt to edit the attribute or position of the slave element;

(e) creating, in response to user input, a distribution frame defining an area on the page bordered by a boundary; and (f) automatically linking the graphical elements to the distribution frame, wherein the graphical elements are encompassed by the boundary.

8. The method of claim 7, wherein the step of establishing a constraint relationship established between the graphical elements includes the step of arranging the graphical elements in the distribution frame in an order.

9. The method of claim 8, wherein the step of arranging the graphical elements in the distribution frame in an order includes the step of locking the order of the graphical elements in the distribution frame so that the order of the graphical elements cannot be rearranged.

10. The method of claim 7, wherein the dimensional attributes for each graphical element determine a shape, size, and color of the graphical element.

* * * * *